(12) United States Patent
Takahashi

(10) Patent No.: US 9,041,832 B2
(45) Date of Patent: May 26, 2015

(54) IMAGING APPARATUS AND METHOD FOR CONTROLLING THE SAME

(71) Applicant: CANON KABUSHIKI KAISHA, Tokyo (JP)

(72) Inventor: Ryo Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 13/727,067

(22) Filed: Dec. 26, 2012

(65) Prior Publication Data

US 2013/0169839 A1 Jul. 4, 2013

(30) Foreign Application Priority Data

Dec. 28, 2011 (JP) ................. 2011-287920
Dec. 28, 2011 (JP) ................. 2011-287921
Dec. 28, 2011 (JP) ................. 2011-287922

(51) Int. Cl.
  *H04N 5/76* (2006.01)
  *H04N 5/77* (2006.01)
  *H04N 9/82* (2006.01)

(52) U.S. Cl.
  CPC ............ *H04N 5/76* (2013.01); *H04N 5/772* (2013.01); *H04N 9/8205* (2013.01)

(58) Field of Classification Search
  CPC ........ H04N 5/76; H04N 5/772; H04N 9/8205
  USPC .................. 348/208.14, 222.1, 231.2, 231.3
  See application file for complete search history.

(56) References Cited

U.S. PATENT DOCUMENTS

| | | | |
|---|---|---|---|
| 8,269,857 B2 * | 9/2012 | Ishizaka | 348/231.2 |
| 2007/0122006 A1 * | 5/2007 | Taniguchi | 382/116 |
| 2008/0002866 A1 | 1/2008 | Fujiwara | |
| 2009/0110248 A1 * | 4/2009 | Masuda et al. | 382/118 |
| 2010/0026842 A1 | 2/2010 | Ishizaka | |
| 2010/0188494 A1 * | 7/2010 | Mukai et al. | 348/77 |

FOREIGN PATENT DOCUMENTS

| | | |
|---|---|---|
| JP | 2000-165706 A | 6/2000 |
| JP | 2010-259088 A | 11/2010 |
| RU | 2175148 C1 | 10/2001 |
| RU | 2382408 C2 | 2/2010 |

* cited by examiner

*Primary Examiner* — Gevell Selby
(74) *Attorney, Agent, or Firm* — Canon U.S.A., Inc. IP Division

(57) ABSTRACT

Even when as an object targeted for registering feature data, an object for which registered feature data has reached an upper limit is selected, replacement of the registered feature data is prompted to register new feature data. An imaging apparatus includes a registration unit configured to register a plurality of feature data up to an upper limit number in association with the same object, a selection unit configured to select one of registered objects for which new feature data is to be registered, and a control unit configured to perform control to display a selection screen for allowing, when the object selected by the selection unit is the object for which the upper limit number of feature data has been registered, a user to select the feature data to be replaced with the new feature data among the upper limit number of feature data registered for the object.

18 Claims, 14 Drawing Sheets

FIG.3

| ID1 | |
|---|---|
| PROFILE | · NAME: Ichiro |
| | · BIRTHDAY: JAN. 1, 1981 |
| NUMBER OF PIECES OF FACE INFORMATION [S1]: 5 | |
| FACE INFORMATION 1 [I11] | · FEATURE DATA 1 [D11] |
| | · FACE IMAGE 1 [F11] |
| FACE INFORMATION 2 [I12] | · FEATURE DATA 2 [D12] |
| | · FACE IMAGE 2 [F12] |
| FACE INFORMATION 3 [I13] | · FEATURE DATA 3 [D13] |
| | · FACE IMAGE 3 [F13] |
| FACE INFORMATION 4 [I14] | · FEATURE DATA 4 [D14] |
| | · FACE IMAGE 4 [F14] |
| FACE INFORMATION 5 [I15] | · FEATURE DATA 5 [D15] |
| | · FACE IMAGE 5 [F15] |

| ID2 | |
|---|---|
| PROFILE | · NAME: Jiro |
| | · BIRTHDAY: FEB. 2, 1983 |
| NUMBER OF PIECES OF FACE INFORMATION [S2]: 3 | |
| FACE INFORMATION 1 [I21] | · FEATURE DATA 1 [D21] |
| | · FACE IMAGE 1 [F21] |
| FACE INFORMATION 2 [I22] | · FEATURE DATA 2 [D22] |
| | · FACE IMAGE 2 [F22] |
| FACE INFORMATION 3 [I23] | · FEATURE DATA 3 [D23] |
| | · FACE IMAGE 3 [F23] |
| FACE INFORMATION 4 [I24] | · — |
| | · — |
| FACE INFORMATION 5 [I25] | · — |
| | · — |

| ID3 |
|---|
| ... |

| IDx |
|---|

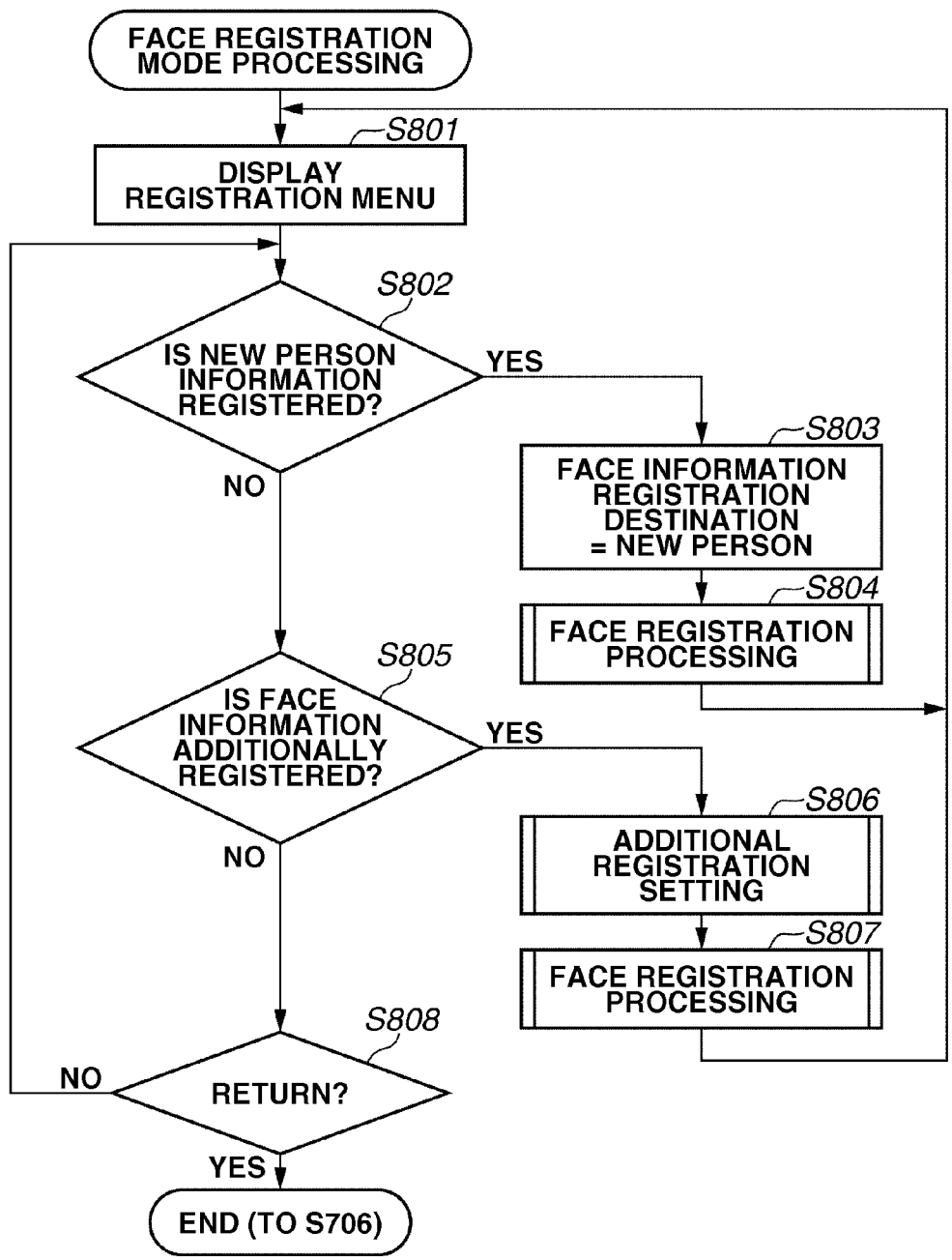

IMAGING APPARATUS AND METHOD FOR CONTROLLING THE SAME

BACKGROUND OF THE INVENTION

1. Field of the Invention

The present invention relates to an imaging apparatus capable of registering feature data of an object for individual authentication, and a method for controlling the apparatus.

2. Description of the Related Art

In these days, there is known an imaging apparatus that provides a function of detecting an object such as a person from a captured image and carrying out an auto-focus (AF) operation for the detected object. Further, there is known an imaging apparatus that can carry out individual authentication for identifying even who the person detected from the image is.

In the imaging apparatus that carries out individual authentication, feature amount data of a person face is registered beforehand in a storage area of a camera, and the individual authentication is executed by collating a feature amount of a face detected during image capturing with the registered feature amount data of the person face. There is provided a function of applying, when the individual authentication is carried out to discover that the detected person matches the registered person, a special effect to the person face or preferentially focusing on the person face.

Japanese Patent Application Laid-Open No. 2010-259088 discusses a method for extracting a feature amount from a face captured by setting a face registration mode of manually registering a face, registering a name, a birthday, and identification priority in association, and carrying out individual authentication (individual identification) by using the registered feature amount of the face.

There has also been offered a method capable of registering a face to be frequently captured without setting a face registration mode by automatically displaying, when a face having the same feature amount not registered is detected several times in an image-capturing mode, a screen for inquiring whether to register the face.

There is known an imaging apparatus that quickly changes to an image-capturing mode when a shutter button is half-pressed not in an image-capturing standby state of the image-capturing mode. Japanese Patent Application Laid-Open No. 2000-165706 discusses an imaging apparatus that carries out control to start an image-capturing operation when a shutter switch 62 is pressed in a displayed state of a menu screen to output a signal SW1 from a switch 62a.

In the individual authentication function, in order to improve authentication accuracy, it is desirable to register a plurality of feature data for the same object. However, in the method discussed in Japanese Patent Application Laid-Open No. 2010-259088, in the face registration mode, when one feature data is registered, the face registration mode is ended. Thus, the face registration mode must be set again to register the plurality of feature data for the same object.

However, for a user having no knowledge about the desirability of registering the plurality of feature data for the same object, there is no motive for setting the face registration mode again to additionally register the feature data for the same object.

As in the case of a baby changing its face features at it grows into a child, reliability of feature data registered in the past is lowered as information for identifying a current object to be captured due to a change of the objet itself with time. Thus, even when the plurality of feature data has been registered, it is desirable to frequently update the registered feature data. Particularly, there is a demand for a user interface that enables easy updating of the feature data.

In the case of a configuration where, when an object targeted for feature data registration is selected, a registration operation is not received even if the feature data registered in the object has reached an upper limit, the user loses a chance to update the feature data. In other words, even when the registered feature data having reached the upper limit includes old feature data, the registered feature data is not updated unless the user is aware that replacement of the old feature data improves authentication accuracy.

Even when the feature data is replaced, addition is not permitted before the feature data is explicitly deleted from a menu for deleting the feature data to secure the number of remaining registerable feature data. This means time and labor for the user.

As discussed in Japanese Patent Application Laid-Open No. 2000-165706, when the camera changes to an image-capturing standby state according to an operation of the shutter button not in an image-capturing standby state, for example, during displaying of a menu screen, it is suitable because the user trying to carryout image-capturing in the image-capturing mode can quickly carry out the image-capturing. However, the operation of the shutter button carried out in an operation mode for registering the face feature data as in the case of the face registration mode of Japanese Patent Application Laid-Open No. 2010-259088 may possibly be for instructing acquisition of an image including a face to be registered. Thus, image-capturing in the image-capturing mode is not necessarily intended.

As a result, when the camera changes to the image-capturing standby state of the image-capturing mode according to the operation of the shutter button in the face registration mode, work contents carried out thus far to register the face are discarded, thus lowering usability.

SUMMARY OF THE INVENTION

The present invention is directed to an imaging apparatus capable of preventing careless interference with registration processing caused by an operation of a shutter button during work of the registration processing of an object and quickly changing to an image-capturing standby state by operating the shutter button in other cases.

According to an aspect of the present invention, an imaging apparatus having an imaging unit, includes a registration unit configured to register a plurality of feature data up to an upper limit number in a nonvolatile memory in association with a same object, an authentication unit configured to identify whether an object detected from an image captured by the imaging unit is a registered object based on the feature data registered in the nonvolatile memory, a selection unit configured to select one of objects registered in the nonvolatile memory for which new feature data is registered by the registration unit, and a control unit configured to perform control to display a selection screen for allowing, when the object selected by the selection unit is the object for which the upper limit number of feature data has been registered, a user to select the feature data to be replaced with the new feature data among the upper limit number of feature data registered for the object, wherein the registration unit registers the new feature data by replacing the feature data selected on the selection screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a diagram illustrating a data structure of a database (face dictionary) of face information for individual authentication.

FIG. 8 is a flowchart illustrating face registration mode processing.

FIGS. 13A to 11F are diagrams illustrating various display examples in face registration processing.

DESCRIPTION OF THE EMBODIMENTS

Various exemplary embodiments, features, and aspects of the invention will be described in detail below with reference to the drawings.

Figure 1:
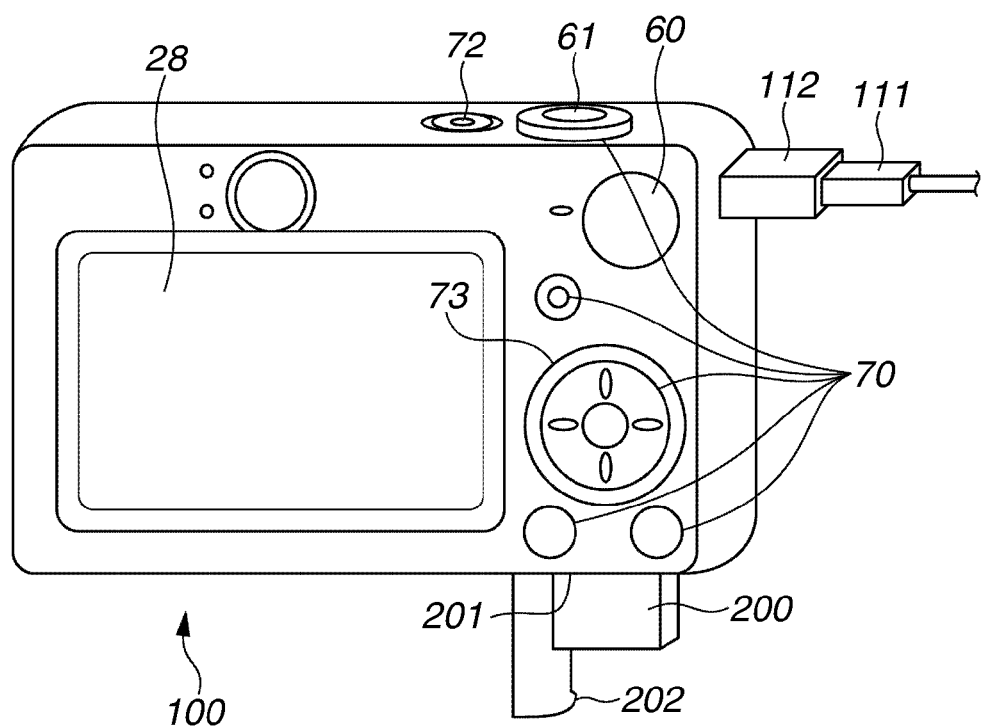
FIG. 1 is a diagram illustrating a rear surface appearance of a digital camera according to an exemplary embodiment of the present invention.

FIG. 1 illustrates an appearance of a digital camera as an example of an imaging apparatus according to an exemplary embodiment of the present invention. A display unit 28 displays images or various pieces of information. A shutter button 61 is a shutter operation unit for instructing image-capturing. A mode dial 60 is an operation unit for switching various modes. A connector 112 connects a connection cable to the digital camera 100.

An operation unit 70 includes operation members such as various switches or buttons for receiving various operations from a user. A control wheel 73 is a rotatable operation member included in the operation unit 70. A power switch 72 switches power ON and OFF. A recording medium 200 is a recording medium such as a detachable memory card or a hard disk.

A recording medium slot 201 is for storing the recording medium 200. The recording medium 200 stored (loaded) in the recording medium slot 201 can communicate with the digital camera 100. A lid 202 is a lid of the recording medium slot 201.

Figure 2:
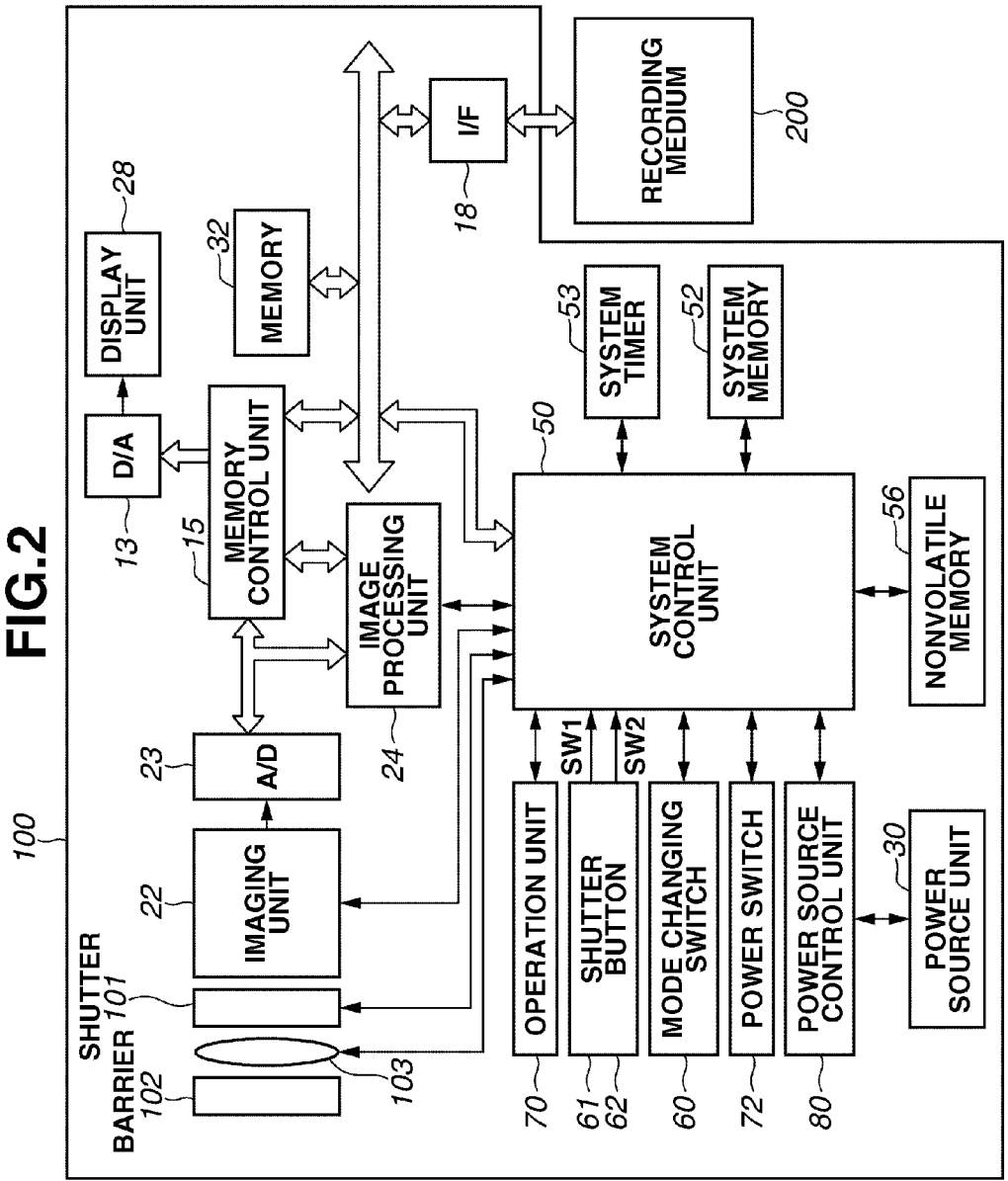
FIG. 2 is a block diagram illustrating a configuration of the digital camera according to the exemplary embodiment of the present invention.

FIG. 2 is a block diagram illustrating a configuration of the digital camera 100 according to the present exemplary embodiment.

In FIG. 2, a photographic lens 103 is a lens group including a zoom lens and a focus lens. A shutter 101 has a diaphragm function. An imaging unit 22 is an image sensor including a charge coupled device (CCD) or a complementary metal-oxide semiconductor (CMOS) device for converting an optical image into an electric signal. An audio-digital (A-D) converter 23 converts an analog signal into a digital signal. The A-D converter 23 is used for converting an analog signal output from the imaging unit 22 into a digital signal. A barrier 102 prevents staining or damaging of an imaging system including the photographic lens 103, the shutter 101, and the imaging unit 202 by covering the imaging system including the photographic lens 103 of the digital camera 100.

An image processing unit 24 carries out predetermined pixel interpolation, resizing processing such as reduction, or color conversion processing for data from the A-D converter 23 or data from a memory control unit 15. The image processing unit 24 carries out predetermined calculation processing by using captured image data. A system control unit 50 carries out exposure control or focusing control based on the acquired calculation result.

Accordingly, auto-focus (AF) processing, automatic exposure (AE) processing, and flash pre-emission (EF) processing of a through-the-lens (TTL) method are carried out. The image processing unit 24 further carries out predetermined calculation processing by using the captured image data, and auto white balance (AWB) processing of the TTL method based on the acquired calculation result.

Data output from the A-D converter 23 is directly written in a memory 32 via the image processing unit 24 and a memory control unit 15 or via the memory control unit 15. The memory 32 is a temporary recording medium for storing image data acquired by the imaging unit 22 and converted into digital data by the A-D converter 23 or image data displayed on the display unit 28. The memory 32 has a storage capacity enough to store a predetermined number of still images, or a moving image or a voice of a predetermined period of time.

The memory 32 also serves as a memory for image displaying (video memory). A D-A converter 13 converts image displaying data stored in the memory 32 into an analog signal to supply it to the display unit 28. The image displaying data thus written in the memory 32 is displayed on the display unit 28 via the D-A converter 13.

The display unit 28 carries out displaying on a display such as a liquid crystal display (LCD) according to the analog signal from the D-A converter 13. The digital signal A-D converted by the A-D converter 23 and stored in the memory 32 is converted into the analog signal by the D-A converter 13, and sequentially transferred to the display unit 28 to be displayed. Thus, the display unit 28 functions as an electronic viewfinder to display a through-image.

A nonvolatile memory 56 is an electrically erasable-recordable memory. For example, an electrically erasable programmable read-only memory (EEPROM) is used. The nonvolatile memory 56 stores constants or programs for operating the system control unit 50. In this case, the program means a program for executing processes of various flowcharts described below in the present exemplary embodiment.

The system control unit 50 controls the entire digital camera 100. By executing the program recorded in the nonvolatile memory 56, each processing of the present exemplary embodiment described below is realized. A random access memory (RAM) is used for a system memory 52. In the system memory 52, a constant or a variable for operating the system control unit 50 or the program read from the nonvolatile memory 56 is rasterized. The system control unit 50 also carries out display control by controlling the memory 32, the D-A converter 13, and the display unit 28.

A system timer 53 measures time used for various types of control and time of an included clock.

A mode changing switch 60, a first shutter switch 62, a second shutter switch 64, and an operation unit 70 are operation units for inputting various operation instructions to the system control unit 50.

The mode changing switch 60 changes an operation mode of the system control unit 50 among a still image recording mode, a moving image recording mode, and a reproducing mode. The still image recording mode includes an auto-image-capturing mode, an auto-scene determination mode, a manual mode, various scene modes where image-capturing setting of respective image-capturing scenes is set, a program AE mode, and a custom mode.

By the mode changing switch 60, the mode is directly changed to one of the modes included in the still image capturing mode. Alternatively, after the mode has been changed to the still image capturing mode by the mode changing switch 60, the mode can be changed to one of the modes included in the still image capturing mode by using another member. Similarly, the moving image capturing mode can include a plurality of modes.

The first shutter switch 62 is turned ON during an operation of the shutter button 61 included in the digital camera 100, namely, half-pressing (image-capturing preparation instruction), to generate a first shutter switch signal SW 1. By the first shutter switch signal SW 1, the system control unit 50 starts an operation such as AF processing, AE processing, AWB processing, or EF processing.

The second shutter switch 64 is turned ON by an operation completion of the shutter button 61, namely, full-pressing (image-capturing instruction), to generate a second shutter switch signal SW 2. By the second shutter switch signal SW 2, the system control unit 50 starts an operation of a series of image-capturing processes from signal reading from the imaging unit 22 to writing of image data in the recording medium 200.

The respective operation members of the operation unit 70, to which functions appropriate for respective scenes are allocated by selecting and operating various functional icons displayed on the display unit 28, operate as various function buttons. Examples of the function buttons are an end button, a return button, an image feeding button, a jump button, a diaphragm narrowing button, and an attribute change button.

For example, when a menu button is pressed, a menu screen for enabling setting of various processes is displayed on the display unit 28. A user can intuitively set various processes by using the menu screen displayed on the display unit 28 such as a four-way vertical and horizontal button, and a SET button.

The control wheel 73 is a rotatable operation member included in the operation unit 70, and used for instructing a selected item operating together with the direction button.

A power source control unit 80 includes a battery detection circuit, a direct current (DC)-DC converter, and a switch circuit for switching a block to be energized, and detects presence of a loaded battery, a type of a battery, or a battery remaining amount. The power source control unit 80 controls the DC-DC converter based on the detection result and an instruction of the system control unit 50, and supplies a necessary voltage to the respective units including the recording medium 200 for a necessary period.

A power source unit 30 includes a primary battery such as an alkaline battery or a lithium battery, a NiCd battery or a NiMH battery, a secondary battery such as a Li battery, and an alternate current (AC) adaptor. A recording medium interface (I/F) 18 is an interface with the recording medium such as a memory card or a hard disk. The recording medium 200, which is a memory card or the like for recording captured images, includes a semiconductor memory or a magnetic disk.

The digital camera 100 can carry out image-capturing using one center point AF or face AF. The one center point AF is AF carried out for one center position point within an image-capturing screen. The face AF is an AF carried out with respect to a face detected within the image-capturing screen by the face detection function.

The face detection function will be described. The system control unit 50 transmits image data of a face detection target to the image processing unit 24. Under control of the system control unit 50, the image processing unit 24 applies a horizontal band pass filter to the image data. Under control of the system control unit 50, the image processing unit 24 applies a vertical band pass filter to the image data. By these horizontal and vertical band pass filters, edge components are detected from the image data.

Then, the system control unit 50 carries out pattern matching for the detected edge components to extracts candidate groups of eyes, noses, mouths, and ears. The system control unit 50 determines those included in the extracted candidate group of eyes and satisfying preset conditions (e.g., distance between two eyes, or inclination) as a pair of eyes, and narrows down those pairs as a candidate group of eyes.

Then, the system control unit 50 correlates the narrowed-down eye candidate group with other parts (nose, mouth and ear) constituting a corresponding face, and puts it through a preset nonface condition filter to detect a face. The system control unit 50 outputs the face information according to the face detection result to end the processing. At that time, the system control unit 50 stores a feature amount such as the number of faces in the system memory 52.

Thus, object information can be detected by analyzing the image data live-view displayed or reproduction-displayed and extracting the feature amount of the image data. In the present embodiment, the example of the face information has been taken as the object information. However, in addition to the object information, various pieces of information on red-eye determination, closed-eye detection, and smiling face detection can be used.

Simultaneously with the face AF, face AE, face FE, and face WB can be carried out. The face AE is for optimizing exposure of the entire screen according to brightness of the detected face. The face FE is for controlling flash light around the detected face. The face WB is for optimizing WB of the entire screen according to color of the detected face.

Further, by comparing the detected face with the feature data stored for individual authentication in the nonvolatile memory 56, whether the detected face is a pre-registered individual face can be identified (individual authentication). By using individual authentication, the face AF, the face AE, the face FE, and the face WB can be carried out by giving priority to, among a plurality of faces detected from the through-image, a registered individual face.

After the registered individual face has been detected, a name of an individually authenticated person can be displayed overlapped with the through-image. Referring to FIG. 3, data recorded for individual authentication in the nonvolatile memory 56 will be described.

FIG. 3 illustrates a data structure of a database (face dictionary) of the face information for individual authentication registered in the memory (nonvolatile memory 56) included in the digital camera 100. An uppermost layer of the data stores person IDs 1 to x (x is a maximum registerable number of people, 12 in the present exemplary embodiment). Layers below the IDs respectively store a profile (name and birthday in the present exemplary embodiment), the number of pieces of face information registered in the same person ID, and each piece of the face information (face image and feature data of face image).

The name is a region for storing a name of a registered person, specifically an ASCII code character string. When a person has been stored, at least one piece of face information of the person is stored. In the present exemplary embodiment, up to five pieces of face information of the same person can be registered (recorded).

To carry out individual authentication, the system control unit 50 collates a face image acquired by image-capturing with feature data of the respective pieces of face information one by one stored in the nonvolatile memory 56, and determines whether the person is a registered person based on a matching degree.

At that time, when there has been recorded a plurality of feature data having variation for the same person, such as feature data in the case of image-capturing in a dark place, feature data in the case of oblique image-capturing, and feature data in the case of front image-capturing, individual authentication can be more accurately carried out in various scenes.

[Overall Flow]

Figure 4:
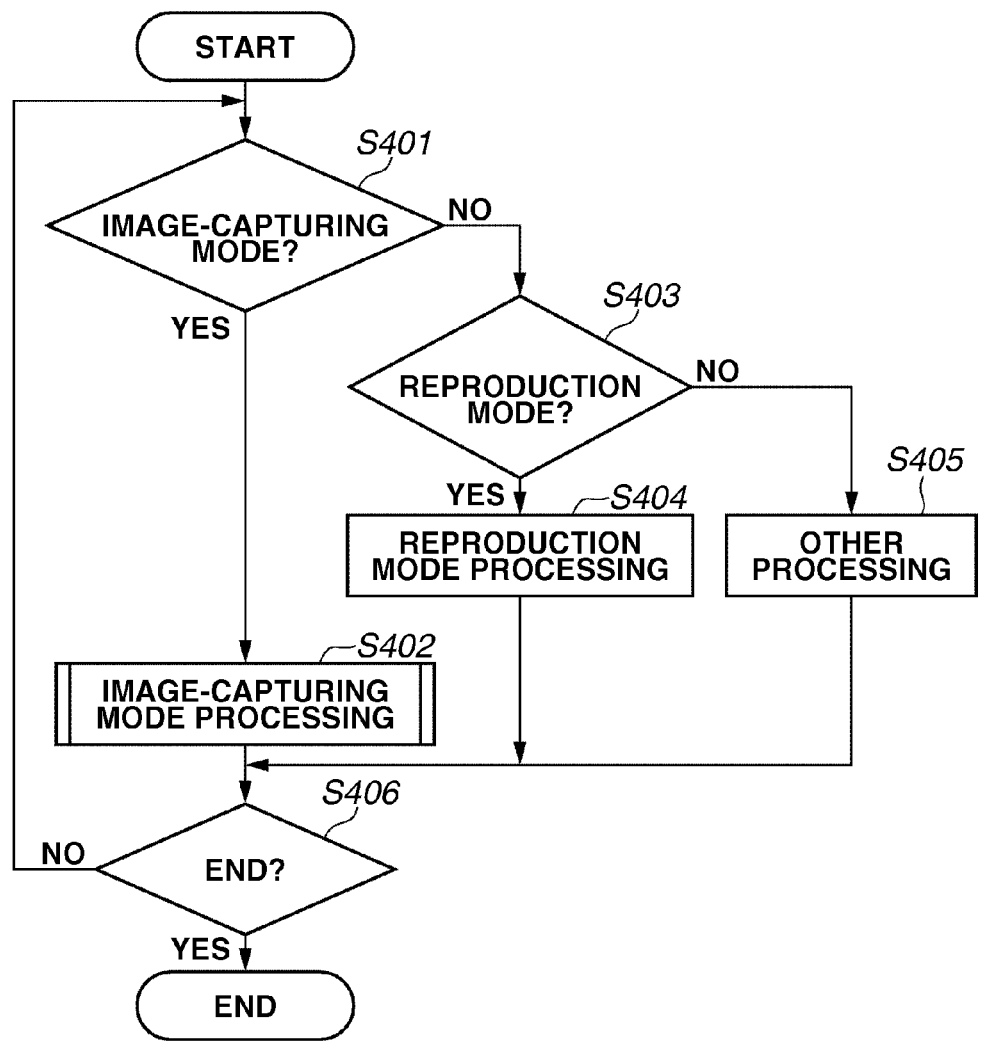
FIG. 4 is a flowchart illustrating an overall flow of the digital camera 100.

FIG. 4 is a flowchart illustrating an overall flow from activation of the digital camera 100 to an end. This processing is realized by loading a program recorded in the nonvolatile memory 56 in the system memory 56 and executing it by the system control unit 50.

When the digital camera 100 is activated, the processing proceeds to step S401. In step S401, the system control unit 50 determines whether a current operation mode is an image-capturing mode. This determination is carried out based on a position of the mode changing switch 60 or a current operation mode recorded in the system memory 52.

When the current operation mode is determined to be an image-capturing mode (YES in step S401), the processing proceeds to step S402 to carry out image-capturing mode processing. The image-capturing mode processing will be described in detail below referring to FIG. 5. When the current operation mode is determined not to be an image-capturing mode (NO in step S401), the processing proceeds to step S403.

In step S403, the system control unit 50 determines whether the current operation mode is a reproduction mode. When it is determined to be the reproduction mode (YES in step S403), the processing proceeds to step S404. Otherwise (NO in step S403), the processing proceeds to step S405.

In step S404, the system control unit 50 carries out reproduction mode processing. In the reproduction mode processing, a captured image recorded in the recording medium 200 is reproduced and displayed. Processing of enlarged reproduction displaying or image deletion is also included.

In step S405, the system control unit 50 carries out other processing. The other processing includes processing in a clock display mode for displaying only current time.

In step S406, the system control unit 50 determines whether an end event has been executed. The end event includes an operation of turning power OFF, an operation of opening a battery lid 202 or automatic power-OFF for automatically turning power OFF when no operation has been executed for a predetermined time. When there is no end event (NO in step S406), the processing returns to step S401 to be continued. When there is an end event (YES in step S406), the system control unit 50 executes shutdown processing to end the processing.

[Image-Capturing Mode Processing]

Figure 5:
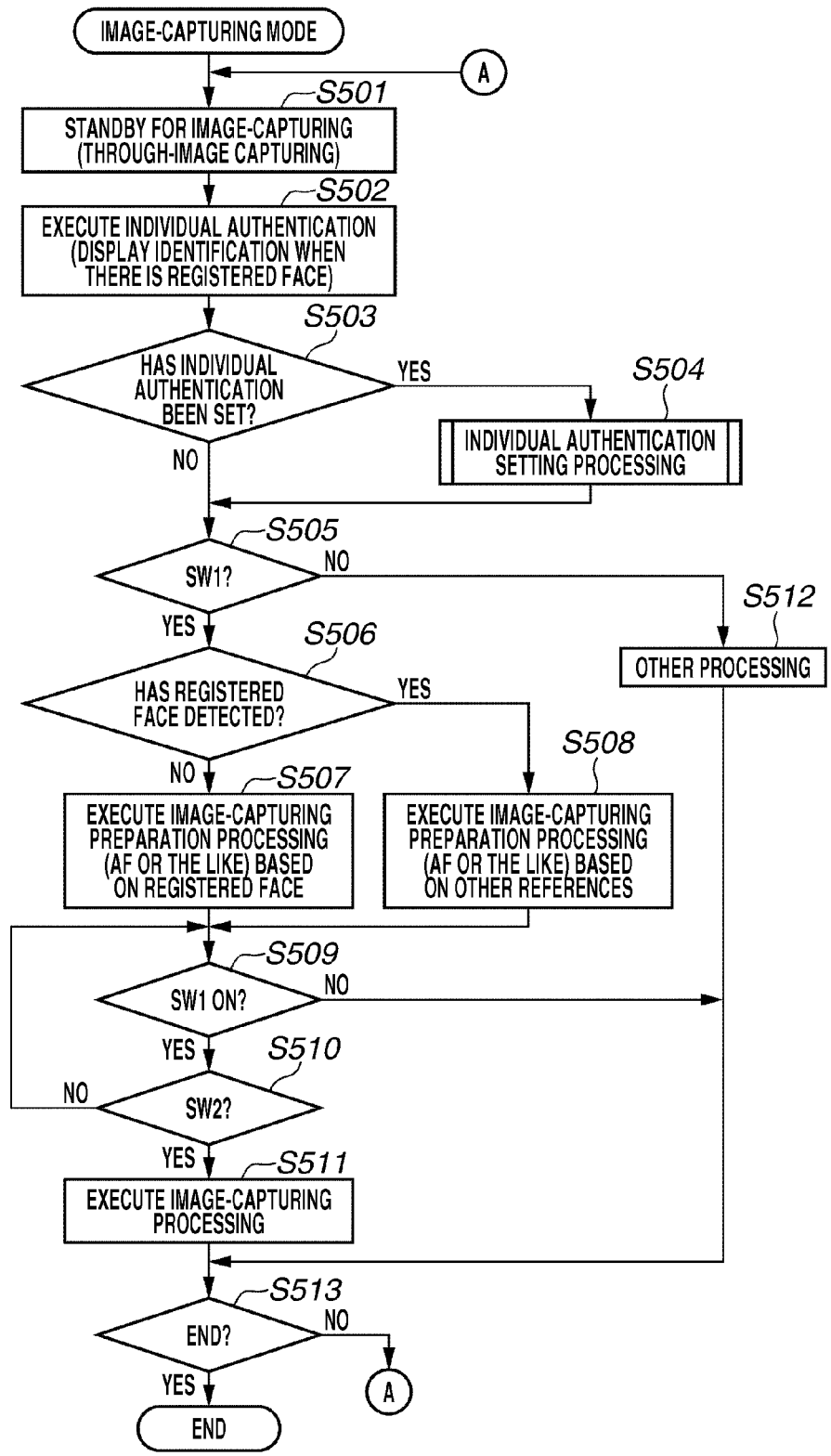
FIG. 5 is a flowchart illustrating image-capturing mode processing.

FIG. 5 is a flowchart illustrating the image-capturing mode processing of step S402. This processing is realized by loading a program recorded in the nonvolatile memory 56 in the system memory 56 and executing it by the system control unit 50.

In step S501, the system control unit 50 carries out image-capturing standby state processing. More specifically, the system control unit 50 captures a through-image by the imaging unit, and displays the through-image on the display unit 28 real time. The details on the capturing of the through-image are as described above. The system control unit 50 displays various setting states and image-capturing conditions on the display unit 28. Further, the system control unit 50 carries out face detection processing by using the captured through-image.

In step S502, the system control unit 50 collates, when a face is detected as a result of the face detection, the detected face with the feature data of the person recorded in the nonvolatile memory 56, and carries out individual authentication for identifying whether the detected face matches the registered person face.

When the detected face is determined to match the registered person face (YES in step S502), the system control unit 50 carries out identification displaying of the face overlapped with the through-image to be recorded. When individual authentication is set to cancellation in an individual authentication setting menu screen, this step is not executed.

Figure 6:
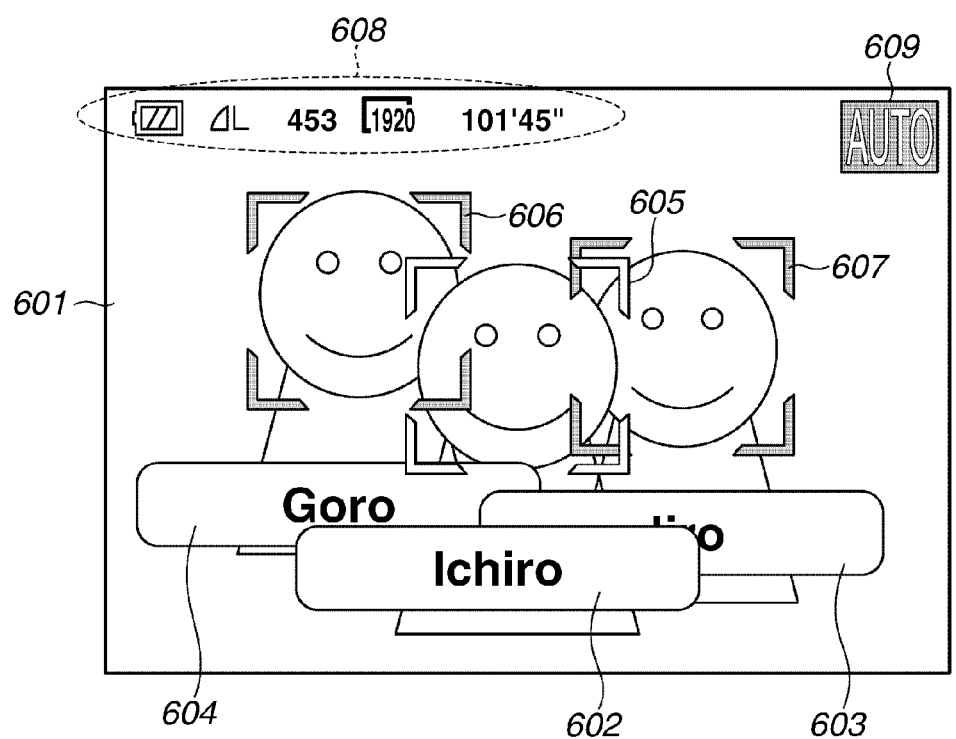
FIG. 6 is a diagram illustrating an example of through-image displaying where a registered face is displayed to be identified.

FIG. 6 illustrates an example of through-image displaying when the registered face is identified and displayed as a result of the processing of step S502. The display unit 28 displays a captured through-image 601. In this example, the through-image 601 includes faces of three persons, which are all registered faces and have been individually authenticated. Names 602 to 604 registered for the persons of the respective persons are displayed slightly below the detected positions of the authenticated faces.

Face frames 606 and 607 are displayed with respect to the detected positions of the authenticated faces. In this case, the face indicated by the face frame 605 and the name 602 (object to whom image-capturing conditions are matched) is determined. Thus, the face frame 605 is displayed white to be discriminated from the other face frames 606 and 607.

The name 602 of the main face is superimposed on the other face names 603 and 604 to be displayed. Setting information 608 indicates a current setting state and image-capturing conditions of the digital camera 100, sequentially from the left, an icon indicating a battery remaining amount, an icon indicating a set compression rate and an image size, a remaining number of photographable pieces, a size of a moving image, and remaining photographable time of a moving image.

An image-capturing mode icon 609 indicates a current image-capturing mode among a plurality of image-capturing modes of a scene mode (portrait mode or landscape mode) optimally set according to an manual mode, an auto-mode, or a shooting scene, a currently set image-capturing mode is an auto-mode.

In step S503, the system control unit 50 determines whether an operation of opening a screen (individual authentication setting screen) for executing setting for individual authentication has been executed. The individual authentication setting screen can be opened by selecting a menu item for individual authentication setting from a menu opened by pressing a menu button included in the operation unit 70 in an image-capturing standby state to press a SET button.

When it is determined that the operation of opening the individual authentication setting screen has been executed (YES in step S503), the processing proceeds to step S504. Otherwise (NO in step S503), the processing proceeds to step S505. In step S504, the system control unit 50 carries out individual authentication setting processing. The individual authentication setting processing will be described in detail below referring to FIG. 7.

In step S505, the system control unit 50 determines whether the shutter button 61 has been half-pressed to turn SW 1 ON. When the SW 1 is ON (YES in step S505), the processing proceeds to step s506. Otherwise (NO in step S505), the processing proceeds to step S512.

In step S506, the system control unit 50 determines whether a person face (registered face) registered in the nonvolatile memory 56 has been detected from the through-image (whether individual authentication has been executed). When it is determined that the registered face has been detected (YES in step S506), the processing proceeds to step s507. Otherwise (NO in step S506), the processing proceeds to step S508.

In step S507, the system control unit 50 carries out image-capturing preparation processing according to the detected registered face (individually authenticated face). The image-capturing preparation processing includes AF, AE, and AWB. When one registered face has been detected, the image-capturing preparation processing is executed according to the face. When a plurality of registered faces has been detected, the image-capturing preparation processing is executed according to priority preset in the registered faces (e.g., image-capturing preparation processing is executed according to a registered face of highest priority).

In step S508, sine no registered face has been detected, the system control unit 50 carries out image-capturing preparation processing according to other conditions. Under the other conditions, for example, face priority AF processing for focusing on a detected face (even in the case of face which is not registered face), one center point AF for focusing on one center point, or AiAF for automatically selecting an AF frame by the camera to focus according to a image-capturing status is carried out.

In step S509, the system control unit 50 determines whether the ON state of the SW 1 continues (whether the shutter button 61 is kept half-pressed). When the SW 1 is not ON (NO in step S509), the result of the image-capturing preparation processing set in step S507 or S508 is cancelled, and the processing proceeds to step S513. When the SW 1 is ON (YES in step S509), the processing proceeds to step S511.

In step S510, the system control unit 50 determines whether the SW 2 has been turned ON (whether the shutter button 61 has been fully pressed). When the SW 2 is not ON (NO in step S510), the processing returns to step s509. When the SW 2 is ON (YES in step S510), the processing proceeds to step S511.

In step S511, the system control unit 50 carries out a series of image-capturing processes from signal reading from the imaging unit 22 to writing of the image data as an image file in the recording medium 200 (referred to as actual image-capturing to be discriminated from image-capturing of through-image).

In step S513, the system control unit 50 determines whether an event has been generated to end the image-capturing mode processing. The event to end the image-capturing mode processing includes, in addition to the operation of turning power OFF, the operation of opening the battery lid 202, and the automatic power-OFF, the operation of changing the mode to other operation modes such as reproduction mode processing. When there is no event (NO in step S513), the processing returns to step S501 to continue the image-capturing standby state. When there is an end event (YES in step S513), the system control unit 50 ends the image-capturing mode processing.

[Individual Authentication Setting Processing]

Figure 7:
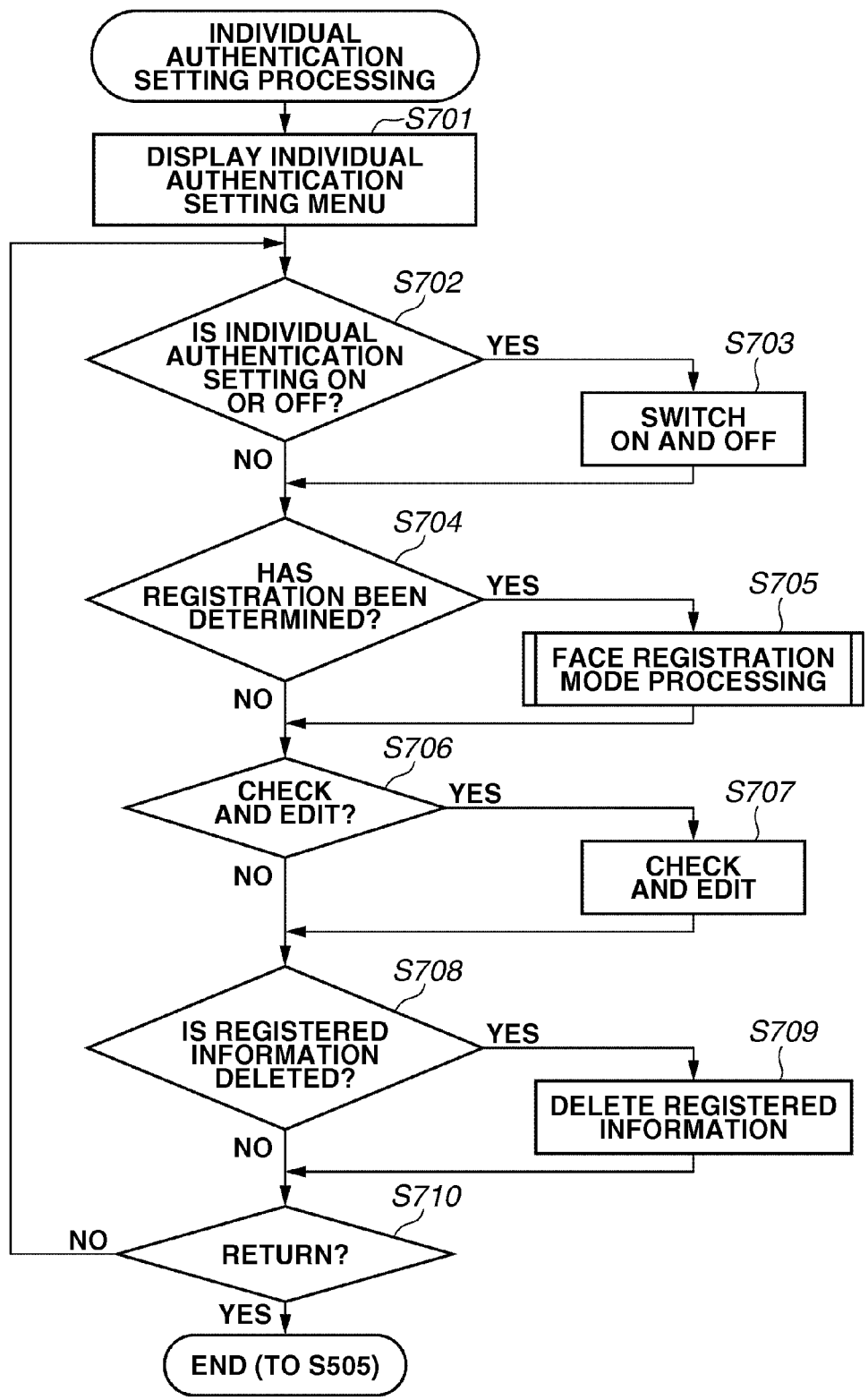
FIG. 7 is a flowchart illustrating individual authentication setting processing in detail.

FIG. 7 is a flowchart illustrating the individual authentication setting processing of step S504 illustrated in FIG. 5. This processing is realized by loading a program recorded in the nonvolatile memory 56 in the system memory 56 and executing it by the system control unit 50.

In step S701, the system control unit 50 displays the individual authentication setting menu screen on the display unit 28.

Figure 9A:
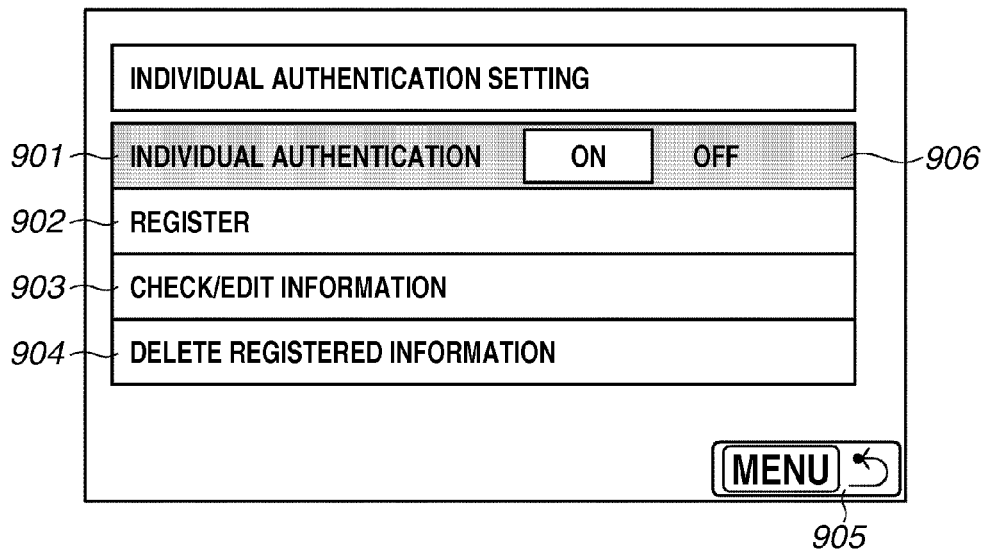
FIG. 9A is a display example illustrating an individual authentication setting menu screen.

FIG. 9A illustrates a display example of the individual authentication setting menu screen. The individual authentication setting menu screen includes four menu items 901 to 904. The menu item 901 is for setting ON or OFF of individual authentication.

When it is ON, the system control unit 50 executes individual authentication in the image-capturing standby state to display a name or the like. When the registered face has been detected, the system control unit 50 carries out image-capturing preparation processing according to the registered face as in the case of step S507 of the image-capturing preparation processing in the actual image-capturing.

When it is OFF, the system control unit 50 does not execute any individual authentication to display a name or the like, nor any image-capturing preparation processing according to the registered face.

The menu item 902 is for registering face information in the nonvolatile memory 56. The menu item 903 is for checking and editing the face information or a profile registered (recorded) in the nonvolatile memory 56. The menu item 904 is for deleting (deleting by ID) pieces of information of a face dictionary registered (recorded) in the nonvolatile memory 56 en bloc for each person.

By operating upper and lower buttons included in the operation unit 70 or the controller wheel 73 to set a cursor 906 to an arbitrary item, and pressing the SET button, the selected menu item can be processed. A return icon 905 indicates a return to a previous screen (immediate upper menu layer) achieved by pressing the menu button included in the operation unit 70.

In step S701, the system control unit 50 determines whether an ON/OFF operation of individual authentication has been executed. The ON/OFF operation of individual authentication can be carried out by setting the cursor to the menu item 901 (individual authentication ON/OFF) to press the SET button or operating a left-right key. When it is determined that ON/OFF operation of individual authentication has been executed (YES in step S702), the processing proceeds to step S703. Otherwise (NO in step S702), the processing proceeds to step S704.

In step S703, the system control unit 50 sets ON/OFF of individual authentication according to a user's operation, and records the set information in the nonvolatile memory 56.

In step S704, the system control unit 50 determines whether a determination operation (operation of pressing SET button according to cursor) has been executed in the menu item 902 (registration). When it is determined that the determination operation has been executed in the menu item 902 (YES in step S704), the processing proceeds to step S705. Otherwise (NO in step S704), the processing proceeds to step S706. In step S705, the system control unit 50 carries out face registration mode processing. The face registration mode processing will be described in detail below referring to FIG. 8.

In step S706, the system control unit 50 determines whether a determination operation has been executed in the menu item 903 ("information checking/editing"). When it is determined that the determination operation has been executed in the menu item 903 (YES in step S706), the processing proceeds to step S707. Otherwise (NO in step S706), the processing proceeds to step S708.

In step S707, the system control unit 50 acquires face information or a profile registered (recorded) in the nonvolatile memory 56 according to a user's operation to display it on the display unit 28. Further, the system control unit 50 edits and updates the face information or the profile registered (recorded) in the nonvolatile memory 56 according to a user's operation By deleting the registered face information and then image-capturing the person face again, the face information registered with respect to the person can be replaced with new face information.

In step S708, the system control unit 50 determines whether a determination operation has been executed in the menu item 904 ("deletion"). When it is determined that the determination operation has been executed in the menu item 904 (YES in step S708), the processing proceeds to step S709. Otherwise (NO in step S708), the processing proceeds to step S710.

In step S709, the system control unit 50 displays a list of registered persons, causes the user to select a person to be deleted, and deletes pieces of registered information about the selected person en bloc from the nonvolatile memory 56. Thus, one ID illustrated in FIG. 3 can be removed.

In step S710, the system control unit 50 determines whether a button having a return function (hereinafter, return button: menu button in the present exemplary embodiment) has been pressed. When it is determined that the return button has not been pressed (NO in step S710), the processing returns to step S702 to be repeated. When it is determined that the return button has been pressed (YES in step S710), the system control unit 50 ends the individual authentication setting processing, and the processing proceeds to step S505 illustrated in FIG. 5.

When in the displayed state of the individual authentication setting menu illustrated in FIG. 9A, the shutter button 61 is half-pressed to turn the SW 1 ON without any determination operation in any choice, the processing proceeds to step S501 illustrated in FIG. 5 to set a image-capturing standby state of the image-capturing mode.

[Face Registration Mode Processing]

FIG. 8 is a flowchart illustrating the face registration processing of step S705 illustrated in FIG. 7. This processing is realized by loading a program recorded in the nonvolatile memory 56 in the system memory 52 and executing it by the system control unit 50.

In step S801, the system control unit 50 displays the registration menu on the display unit 28.

Figure 9B:
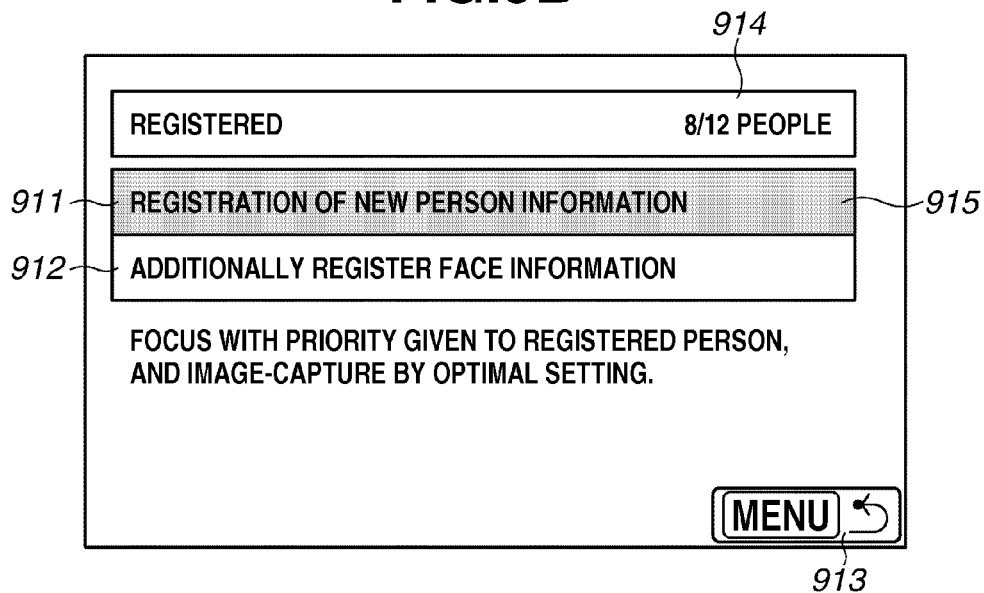
FIG. 9B is a display example illustrating a registration menu.

FIG. 9B illustrates a display example of the registration menu. The registration menu includes a menu item 911 ("registration of new person information"), and a menu item 912 ("additional registration of face information"). In a state of moving the cursor 915 to select one of the menu items, a determination operation can be carried out by pressing the SET button.

A return icon 913 indicates a return to a previous screen (immediate upper menu layer) achieved by pressing the menu button included in the operation unit 70. The number of registered persons 91 indicates an upper limit number of persons to be individually authenticated registerable in the nonvolatile memory 56, and the number of currently registered persons.

In the illustrated example, currently eight persons have been registered, and up to twelve persons can be registered. Since any new person information cannot be registered when the number of registered persons has reached the registerable upper limit, a menu item 911 is grayed out, and a determination operation in the menu item 911 is not received.

In step S802, the system control unit 50 determines whether a determination operation has been executed in the menu item 911 ("registration of new person information"). When it is determined that the determination operation has been executed in the menu item 911 (YES in step S802), the processing proceeds to step S803. Otherwise (NO in step S802), the processing proceeds to step S805. When the number of registered persons has reached the upper limit of 12, a determination operation in the menu item 911 is not received. Thus, the determination of step S802 is not carried out.

In step S803, the system control unit 50 sets, in order to set a registration destination of face information to be image-captured and acquired as a new person, a new ID as the ID illustrated in FIG. 3 as a registration destination (stores it in system memory 52).

In step S804, the system control unit 50 carries out face registration processing. The face registration processing will be described in detail below referring to FIG. 12 (12A+12B).

In step S805, the system control unit 50 determines whether a determination operation has been executed in the menu item 912 ("additional registration of face information"). When it is determined that the determination operation has been executed in the menu item 912 (YES in step S805), the processing proceeds to step S806. Otherwise (NO in step S805), the processing proceeds to step S808.

In step S806, the system control unit 50 carries out additional registration processing. The additional registration processing will be described in detail below referring to FIG. 10.

In step S807, the system control unit 50 carries out face registration processing. The face registration processing, which is similar to that of step S804, will be described below referring to FIG. 12.

In step S808, the system control unit 50 determines whether the return button has been pressed. When it is determined that the return button has not been pressed (NO in step S808), the processing returns to step S802 to be repeated. When it is determined that the return button has been pressed (YES in step S808), the system control unit 50 ends the face registration mode processing, and displays the individual authentication setting menu. The processing proceeds to step S706 illustrated in FIG. 7.

When, in the displayed state of the registration menu illustrated in FIG. 9B, the shutter button 61 is half-pressed to turn the SW 1 ON without any determination operation in any choice, the processing proceeds to step S501 illustrated in FIG. 5 to set a normal image-capturing standby state of the image-capturing mode.

[Additional Registration Setting]

Figure 10:
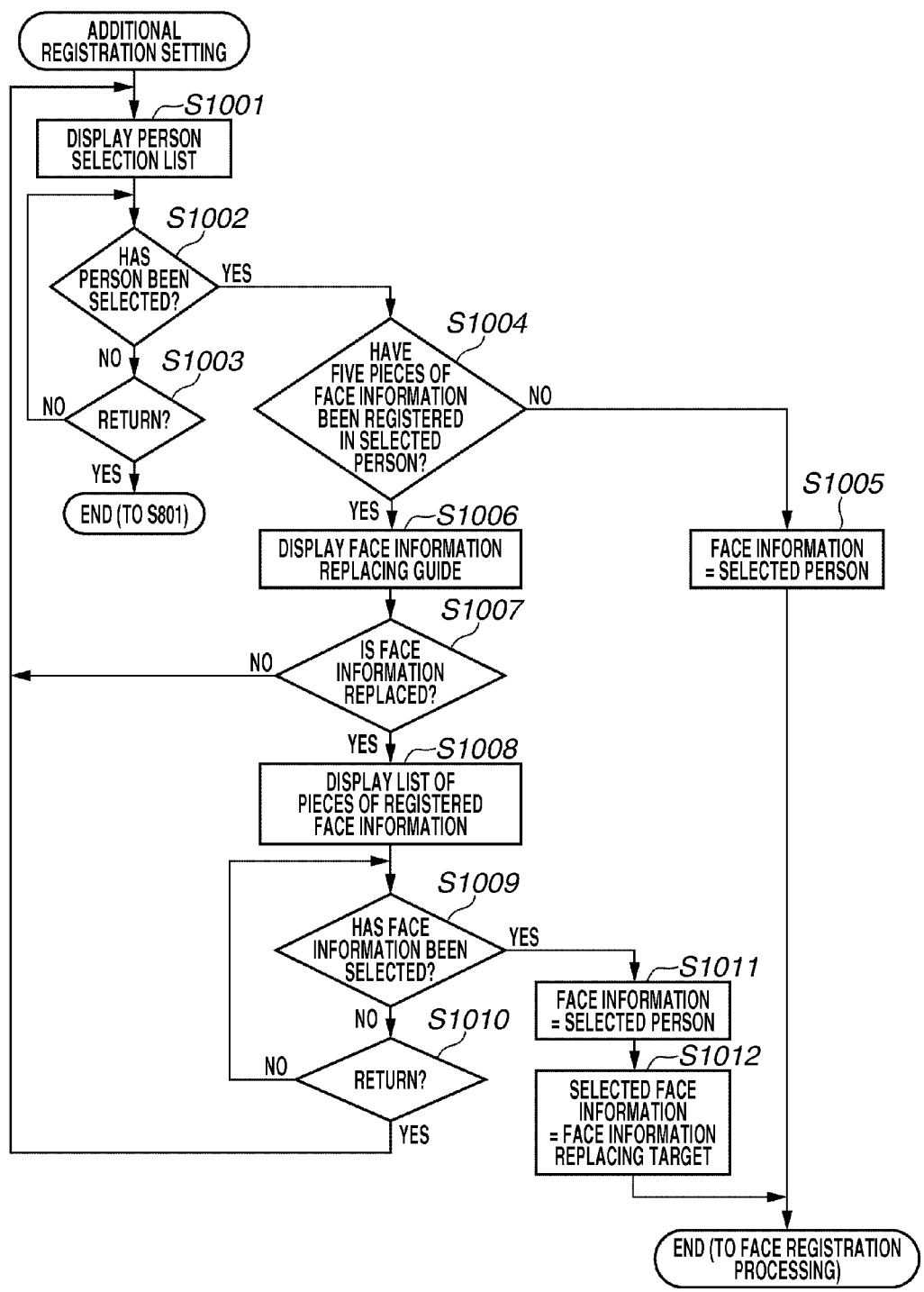
FIG. 10 is a flowchart illustrating additional registration setting.

FIG. 10 is a flowchart illustrating the additional registration processing of step S806 illustrated in FIG. 8. This processing is realized by loading a program recorded in the nonvolatile memory 56 in the system memory 52 and executing it by the system control unit 50.

In step S1001, the system control unit 50 displays on the display unit 28 a person selection list for selecting a person face information of which is to be additionally registered.

Figure 11A:
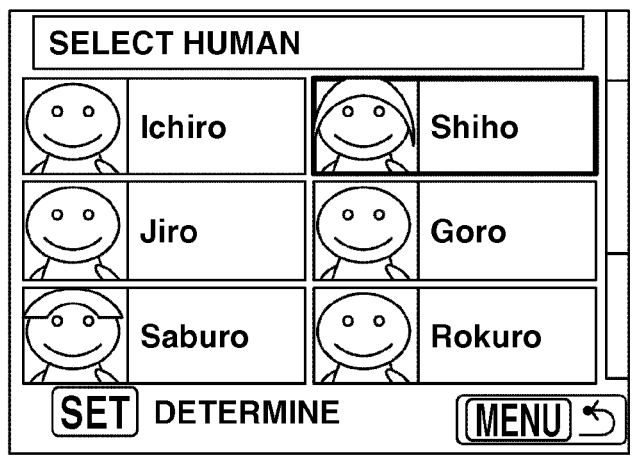
FIGS. 11A to 11C are diagrams illustrating various display examples in additional registration setting.

FIG. 11A illustrates a display example of the person selection list. In the person selection list, as illustrated, a list of face images (recorded in face information of the respective persons) and names of the respective persons recorded in the nonvolatile memory 56 is displayed in correspondence with each other.

The user can select a person whose face information is to be additionally registered by operating the direction button (upper-lower and left-right key) included in the operation unit 70 or the control wheel 73 to move the cursor to an arbitrary person and then pressing the SET button (determination operation).

In step S1002, the system control unit 50 determines whether any person has been selected from the displayed person selection list (determination operation has been executed). When it is determined that the person has been selected (YES in step S1002), the processing proceeds to step S1004. Otherwise (NO in step S1002), the processing proceeds to step S1003.

In step S1003, the system control unit 50 determines whether the return button has been pressed. When it is determined that the return button has not been pressed (NO in step S1003), the processing returns to step S1002 to wait for a person selection operation. When it is determined that the return button has been pressed (YES in step S1003), the processing ends the additional registration setting processing, and proceeds to step S801 (face registration mode).

In step S1004, the system control unit 50 refers to the nonvolatile memory 50 to determine whether five pieces of face information (upper limit number of pieces of face information) have been registered for the person selected in step S1002.

When it is determined that the five pieces of face information have not been registered (NO in step S1004), face information can be additionally registered, and thus the processing proceeds to step S1005. The system control unit 50 sets the ID of the person selected in step S1002 (stores it in system memory 52) as a registration destination of face information to be acquired by image-capturing. On the other hand, when it is determined that the five pieces of face information have been registered (YES in step S1004), any face information cannot be registered without replacing one of the registered pieces of face information, and thus the processing proceeds to step S1006.

Figure 11B:

In step S1006, the system control unit 50 displays a face information replacement guide on the display unit 28. FIG. 11B illustrates a display example of the face information replacement guide. In the face information replacement guide, a message indicating that the upper limit number of pieces of face information for the selected person has been registered or an inquiry as to whether to replace the registered face information is displayed.

In step S1007, the system control unit 50 determines whether face information replacement has been instructed (whether determination operation has been executed with "OK" illustrated in FIG. 11B) on the display screen of the face information replacement guide.

When it is determined that the face information replacement has been instructed (determination operation has been executed with "OK" illustrated in FIG. 11B) (YES in step S1007), the processing proceeds to step S1008. Otherwise (determination operation has been executed with "CANCEL" illustrated in FIG. 11B) (NO in step S1007), the processing proceeds to step S1001 to receive selection of another person.

Figure 11C:
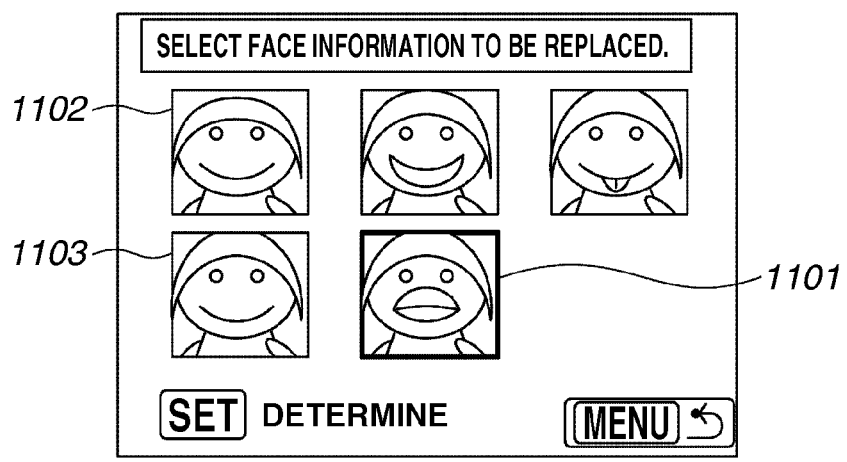

In step S1008, the system control unit 50 refers to the face information of the person selected in S1002, displays a list of pieces of registered face information on the display unit 28 as a selection screen for selecting the face information to be replaced with new face information. FIG. 11C illustrates a display example of the list of pieces of registered face information.

In the registered face information list, a list of face images as the face information of the person selected in step S1002 is displayed. In this scene, the upper limit of face information registerable for one person has been reached, and thus the number of face images is five (upper limit). The user can select face information to be replaced by operating the direction button (upper-lower and left-right key) included in the operation unit 70 or the control wheel 73 to move the cursor 1101 to an arbitrary face image and then pressing the SET button (determination operation).

In the registered face information list, it is desirable to initial-display the cursor 1101 with respect to a face image of an oldest registration date. In this case, a registration date is also recorded in association with each face information. Alternatively, for each registration of new face information, new ID is added, and oldest face information can be identified from oldest ID.

Thus, the user can select the oldest face information as a replacement target without moving the cursor. In an actual world, the face of even the same person changes with time (as it ages).

Thus, in the case of the old face information, reliability as face information to authenticate a person face currently captured by the camera is low. By replacing the old face information with new face information, improvement of accuracy of individual authentication can be expected. In view of this, by setting the oldest face information for initial-displaying the cursor 1101, the old face information is easily replaced, and a face replacing frequency leading to reliability improvement of the individual authentication is increased.

In step S1009, the system control unit 50 determines whether any face information has been selected from the displayed face information list (determination operation has been executed). When it is determined that the face information has been selected (YES in step S1009), the processing proceeds to step S1011. Otherwise (NO in step S1009), the processing proceeds to step S1010.

In step S1010, the system control unit 50 determines whether the return button has been pressed. When it is determined that the return button has been pressed (i.e., replacement of face information having reached upper limit is cancelled) (YES in step S1010), the processing returns to step S1001, and displays the person selection list to enable selection of another person. When it is determined that the return button has not been pressed (NO in step S1010), the processing returns to step 1009 to receive selection of face information to be replaced.

In step S1011, the system control unit 50 sets the ID of the person selected in step S1002 as person ID of a registration destination of face information image-captured and acquired (stores it in system memory 52).

In step S1012, the system control unit 50 sets face information image-captured and acquired as information to replace and overwrite the face information selected in step S1009 (stores it in system memory 52).

Figure 12:
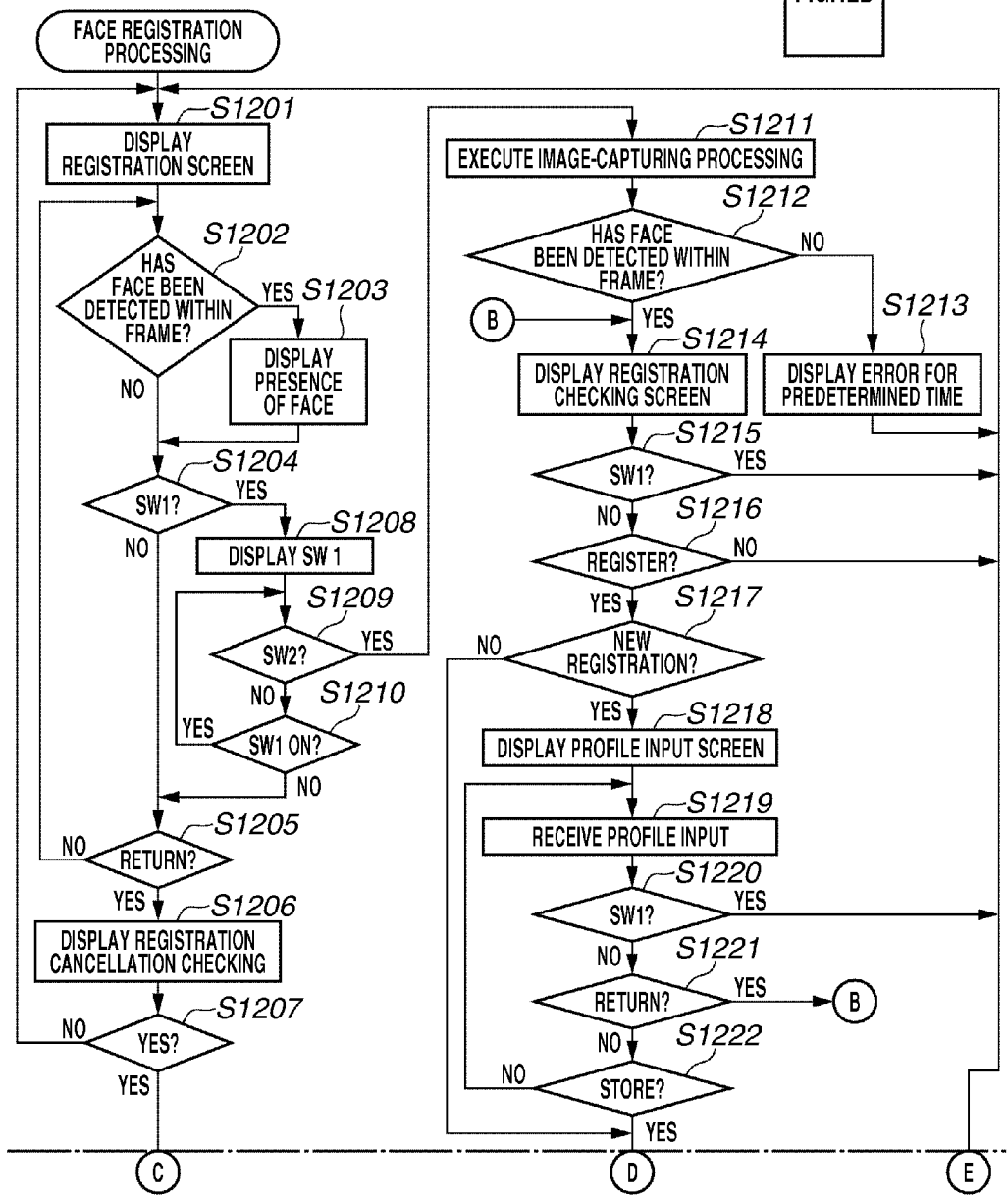
FIG. 12 (12A+12B) is a flowchart illustrating face registration processing.
Figure 12B:
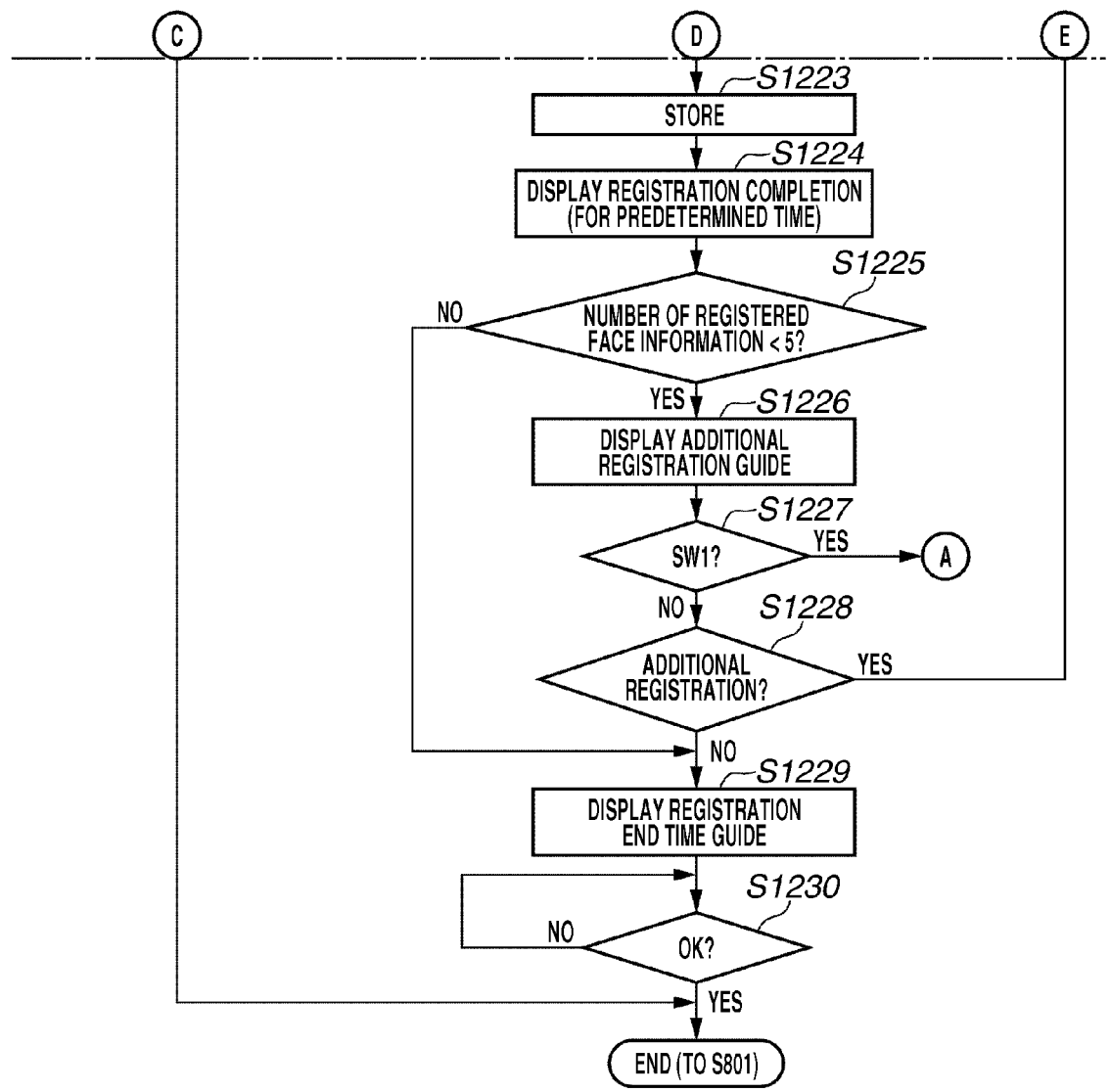

After the end of steps S1005 and S1012, the additional registration setting processing is ended, and then face registration processing illustrated in FIG. 12 is carried out.

When the shutter button 61 is half-pressed to turn the SW 1 ON before the end of the additional registration setting processing illustrated in FIG. 10 (before end of step S1005 or S1012), the processing proceeds to step S501 illustrated in FIG. 5 to set a normal image-capturing standby state of the image-capturing mode.

Thus, in the additional registration setting according to the present exemplary embodiment, when the operation of further registering face information for the person where the number of pieces of registered face information has reached its upper limit (YES in step S1004), the processing is not that the system control unit 50 does not receive a registration operation but that replacement of the registered face information is prompted.

In other words, even without executing an operation of explicitly deleting the old face information (e.g., operation of deleting face information by executing determination operation in menu item 903 on the individual authentication setting menu), the old face information can be replaced with new face information of high reliability. As a result, the face dictionary can be kept in a state where high accuracy individual authentication can be performed.

[Face Registration Processing]

FIG. 12 (12A+12B) is a flowchart illustrating the face registration processing of steps S804 and S807 illustrated in FIG. 8. This processing is realized by loading a program recorded in the nonvolatile memory 56 in the system memory 52 and executing it by the system control unit 50.

Figure 13A:
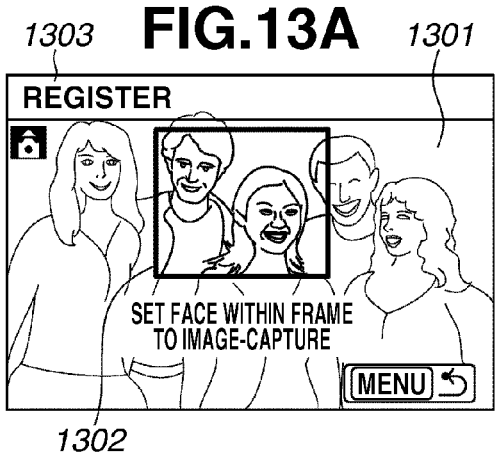

In step S1201, the system control unit 50 captures a through-image by the imaging unit 22 and displays the registration menu using the through-image on the display unit 28. This state is referred to as a registration standby state. FIG. 13A illustrates a display example of the registration screen in the registration standby state.

A through-image 1301 is displayed on the display unit 28. A face registration frame 1302 is displayed in the screen center. The through-image 1301 located outside the face registration frame 1302 is displayed dark. A display item 1303 indicates the registration screen in the registration standby state.

In the registration standby state, the user can register face information of a desired face by framing a face to be registered within the face registration frame 1302 and fully pressing the shutter button 61.

In step S1202, the system control unit 50 carries out face detection processing, and determines whether in the captured through-image, a face has been detected inside the face registration frame 1302. When it is determined that a face has been detected inside the face registration frame 1302 (YES in step S1202), the processing proceeds to step S1203. Otherwise (NO in step S1202), the processing proceeds to step 1204.

In step S1203, the system control unit 50 displays presence of the face inside the face registration frame 1302. Specifically, the system control unit 50 changes the face registration frame 1302 to be gray to white. By seeing the color change, the user can identify whether the face can be registered by fully pressing the shutter button 61 at the present time.

In step S1204, the system control unit 50 determines whether the SW 1 is ON. When it is determined that the SW 1 is ON (YES in step S1204), the processing proceeds to step S1208. Otherwise (NO in step S1204), the processing returns to step 1205.

In step S1205, the system control unit 50 determines whether the return button has been pressed. When it is determined that the return button has been pressed (YES in step S1205), the processing proceeds to step S1206. Otherwise (NO in step S1205), the processing returns to step S1202 to continue the face registration processing.

In step S1206, the system control unit 50 displays on the display unit 28 a message of checking whether to cancel the face registration processing. Specifically, a message "CANCEL?" and a choice of "YES/NO" are displayed. Accordingly, a case where because of careless cancellation of the face registration processing caused by an operation mistake, the processing must be carried out all over again from the face registration mode processing illustrated in FIG. 8 can be prevented.

In step S1207, the system control unit 50 determines which of the options, YES and NO, displayed in step S1206 has been selected. When it is determined that "NO" has been selected (NO in step S1207), the processing returns to step S1201, and displays the registration screen to continue the face registration processing. When it is determined that "YES" has been selected (YES in step S1207), the system control unit 50 ends the face registration processing, and the processing returns to step S801 illustrated in FIG. 8.

On the other hand, when it is determined that SW 1 is ON (YES in step S1204), in step S1208, the system control unit 50 executes displaying at the ON-time of the SW 1. Specifically, those other than the display item 1303 (character string of "REGISTER"), a guidance ("ENTER FACE WITHIN FRAME TO PHOTOGRAPH"), the face registration frame 1302, and the through-image are not displayed.

That is, the return icon or the like is not displayed. When a face has been detected within the face registration frame 1302, a color of the face registration frame 1302 is set to green.

In step S1209, the system control unit 50 determines whether the SW 2 is ON. When it is determined that the SW 2 is ON (YES in step S1209), the processing proceeds to step S1211. Otherwise (NO in step S1209), the processing proceeds to step 1210.

In step S1210, the system control unit 50 determines whether the ON state of the SW 1 continues (whether the shutter button 61 is kept half-pressed). When it is determined that the SW 1 is ON (YES in step S1210), the processing returns to step S1209 to wait for a signal of the SW 2. Otherwise (NO in step S1209), the processing proceeds to step S1205.

When the SW 2 is ON, in step S1211, the system control unit 50 captures an image of resolution higher than that of the through-image in the memory 32 by the imaging unit 22. In the captured image, a face is detected within a range corresponding to the face registration frame 1302. When the face is detected, a feature amount of the face is extracted. After the face has been detected, a feature amount extracted from the detected face is recorded as feature data in the system memory 52.

In step S1212, the system control unit 50 determines whether, in the image captured in step S1211, a face satisfying a registration criterion has been detected within a range corresponding to the inside of the face registration frame 1302.

The face satisfying the registration criterion is a face having a larger size than a specific size with respect to a size of the face registration frame 1302, and in focus. Even when a face satisfying the registration criterion has been detected within the face registration frame 1302, if the face has a size smaller than the specific size or not in focus, face information is not registered determining that any face satisfying the registration criterion has not been detected.

When it is determined that a face satisfying the registration criterion has not been detected within the face registration frame 1302 (NO in step S1212), the processing proceeds to step S1213. When it is determined that a face satisfying the registration criterion has been detected within the face registration frame 1302 (YES in step S1212), the processing proceeds to step S1214.

In step S1213, the system control unit 50 displays a message that face information has not been detected on the display unit 28 for a predetermined time (several seconds). Specifically, the system control unit 50 displays a character string of "NOT REGISTERED, CAPTURE IMAGE AGAIN" for the predetermined time, and then the processing returns to step S1201 to display the registration screen again.

Figure 13B:
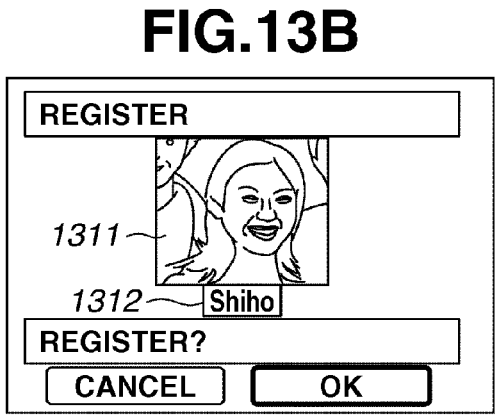

In step S1214, the system control unit 50 displays a registration checking screen for inquiring the user whether to register the face information from the image captured in response to the SW 2 signal and stored in the memory 32 in step S1209 on the display screen 28. FIG. 13B illustrates a display example of the registration checking screen.

On the registration checking screen, a face image 1311 cutting out the range based on the face detected within the face registration frame 1302 is displayed. When the face information is registered, the face image 1311 and feature data extracted from this face and recorded in the system memory 52 are registered. In other words, the registered face information list illustrated in FIG. 11C or the face image displayed on the checking screen of the registered face information displayed in step S707 illustrated in FIG. 7 can be checked beforehand.

When the registration of the face information is not registration of a new person but additional registration as face information of the registered person, a name 1312 of the registered person is also displayed. In the case of registration of a new person, a name is not displayed. On the registration checking screen, the face image 1311 and options "CANCEL" and "OK" as to whether to register the face information acquired from the face image 1311 are displayed.

In step S1215, the system control unit 50 determines whether the SW 1 is ON. When it is determined that the SW 1 is ON (YES in step S1215), the system control unit 50 discards the image captured in step S1211 and temporarily stored in the memory 32 and the feature data recorded in the system memory, and the processing returns to step S1201 to display the registration screen again. Otherwise (NO in step S1215), the processing proceeds to step 1216.

When the SW 1 is turned ON in other operation states such as a reproduction mode or a menu display mode, the image-capturing standby mode (state of step S501 illustrated in FIG. 5) in the image-capturing mode is set. In this case, however, the processing returns to the registration screen of the face information without returning to the image-capturing standby state. This is because the timing is after the acquisition of the image including the face to be registered in step S1211 and before registration in step S1223 described below.

It can be deduced that what the user has intended by turning the SW 1 ON at this timing (half-pressing of shutter button 61) is not execution of actual image-capturing but re-acquisition of face information. For the user wishing to re-acquire face information, the return to the image-capturing standby state by half-pressing the shutter button 61 is troublesome because the individual authentication setting processing, the face registration mode processing, and the additional registration processing must be executed again.

On the other hand, in the case of the return to the registration standby state in the face registration processing by half-pressing the shutter button 61, the face registration processing can be carried out while maintaining the results of the individual authentication setting processing, the face registration mode processing, and the additional registration processing executed thus far. Thus, the number of operations is reduced, and usability of the photographer is improved.

In the case of re-acquiring face information by half-pressing the shutter button 61 at the timing in step S1215, the user only needs to return to the registration standby state by half-pressing the button 61 again without removing the finger that has fully pressed the shutter button 61.

In the case of re-acquiring an image including a face to be registered, the user only needs to execute framing without removing the finger from the shutter button 61 to set a face of a person to be registered within the face registration frame 1302, and then fully press the shutter button 61.

Thus, only by operating the shutter button 61, the registration is canceled after watching the face image 1311 on the registration checking screen to return to the registration standby state, and a face image can be acquired again.

In step S1216, the system control unit 50 determines whether registration has been instructed on the registration checking screen, i.e., which of "CANCEL" (execution operation) and "OK" (execution operation) has been selected. When it is determined that registration has been instructed ("OK" has been selected) (YES in step S1216), the processing proceeds to step S1217. When it is determined that "CANCEL" has been selected (NO in step S1216), the processing returns to step S1201 to display the registration screen again.

In step S1217, the system control unit 50 refers to the information of the registration destination of the face information temporarily stored in the system memory 52 to determine whether a person is a new person (new registration of a person). When the person is a new person (YES in step S1217), the processing proceeds to step S1218. Otherwise (NO in step S1217), the processing proceeds to step S1223.

Figure 13C:
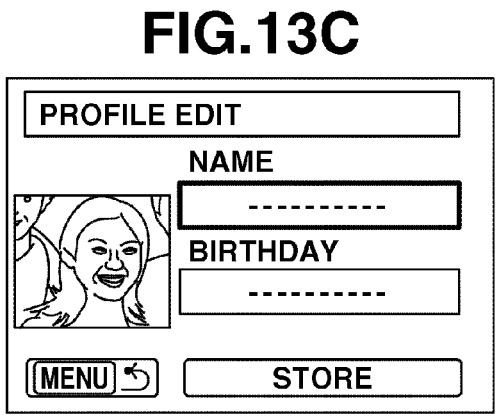

In step S1218, the system control unit 50 displays a profile input screen illustrated in FIG. 13C on the display unit 28, and prompts the user to input a profile (name and birthday) of the person face information of which is registered.

In step S1219, the system control unit 50 receives an input of the profile from the user using the operation unit 70. The system control unit 50 temporarily stores the input profile information in the system memory 52.

In step S1220, the system control unit 50 determines whether the SW 1 is ON. When it is determined that the SW 1 is ON (YES in step S1220), the system control unit 50 discards the image captured in step S1211 and temporarily stored in the memory 32, the profile input in the midway temporarily stored in the system memory 52, and the feature data, and the processing returns to step S1201 to display the registration screen again.

When the SW 1 is turned ON in other operation states such as a reproduction mode or a menu display mode, the image-capturing standby mode (state of step S501 illustrated in FIG. 5) in the image-capturing mode is set. In this case, however, the processing returns to the registration screen of the face information without returning to the image-capturing standby state.

This is because, as in the case of the determination in step S1215, it can be deduced that what the user has intended by turning the SW 1 ON at this timing (half-pressing of shutter button 61) is not execution of actual image-capturing but re-acquisition of face information.

In step S1221, the system control unit 50 determines whether the return button has been pressed. When it is determined that the return button has been pressed (YES in step S1221), the processing returns to step S1214 to display the registration checking screen. Otherwise (NO in step S1221), the processing proceeds to step S1222.

In step S1222, the system control unit 50 determines whether a determination operation (operation of pressing SET button according to cursor) has been executed by a storage button displayed on the profile input screen. When it is determined that the determination operation has been execution (YES in step S1222), the processing proceeds to step S1223. Otherwise (NO in step S1222), the processing returns to step S1219 to continuously receive the profile input.

In step S1223, the system control unit 50 records in the nonvolatile memory 56, in the image captured in step S1211 and temporarily stored in the memory 32, the face image 1311 cutting out a range based on the face detected within the face registration frame 1302 and face feature data extracted from the face as face information. ID of the registration destination is the registration destination stored in the system memory 52 in steps S803, S1005, and S1011.

When a replacement target of the face information has been set in step S1012, the system control unit 50 replaces the replacement target of the face information stored in step S1012 with new face information to record it. The system control unit 50 also records in the nonvolatile memory 56 the profile input in step S1219 and temporarily stored in the system memory 52.

After the face information has been registered, the system control unit 50 discards the image captured in step S1211 and temporarily stored in the memory 32, and the feature data and the profile temporarily stored in the system memory 52.

Figure 13D:

In step S1224, the system control unit 50 displays registration completion indicating that the face information has been registered on the display unit 28 for a predetermined time (several seconds). FIG. 13D illustrates a display example of the registration completion. When the SW 1 is turned ON during the displaying of this screen, the processing proceeds not to the face registration processing of step S1201 but to the image-capturing standby state of the image-capturing mode (step S501 illustrated in FIG. 5).

This is because since registration of at least one piece of face information has been completed in step S1223, it can be deduced that what the user has intended by half-pressing of shutter button 61 is not re-execution of the face registration processing. Rather, it can be deduced that it is an operation carried out when normal image-capturing is executed immediately after the registration of the face information. In such a case, there is an effect of a quick change to the image-capturing standby state for normal image-capturing.

In step S1225, the system control unit 50 determines the number of pieces of face information registered for the person of the ID of the currently registered face information is less than five. When less than five (YES in step S1225), the processing proceeds to step S1226. Otherwise (NO in step S1225), the processing proceeds to step S1229.

Figure 13E:
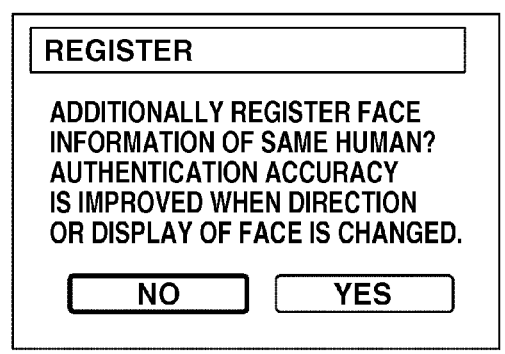

In step S1226, since the number of pieces of face information registerable for the person of the ID of the currently registered face information has not reached the upper limit, the system control unit 50 displays an additional registration guide on the display unit 28. FIG. 13E illustrates a display example of the additional registration guide.

In the additional registration guide, a message for inquiring whether to additionally register face information of the same person and a message indicating that authentication accuracy is improved by registering the face by changing the face direction or the facial expression is displayed to prompt the user to additionally register face information. Options of "YES" or "NO" are also displayed.

Thus, when the number of pieces of registerable face information has not reached the upper limit, by prompting the user to register the face changed in direction or facial expression, face information having variation is registered, and accuracy of individual authentication is improved.

In step S1227, the system control unit 50 determines whether the SW 1 is ON. When it is determined that the SW 1 is ON (YES in step S1227), the processing proceeds to the image-capturing standby state of the normal image-capturing mode of step S501 illustrated in FIG. 5. Otherwise (NO in step S1227), the processing proceeds to step S1228.

A reason for the return to the image-capturing standby state by the turning-ON of the SW 1 at this timing is similar to that in step S1224, i.e., registration of at least one piece of face information has been completed in step S1223.

In step S1228, the system control unit 50 determines whether additional registration has been instructed on the additional registration guide display (i.e., determination operation has been executed in choice "YES"). When it is determined that the additional registration has been instructed (determination operation has been executed in choice "YES") (YES in step S1228), the processing returns to step S1201 to display the registration screen, and receive registration of more face information.

In this case, the system control unit 50 keeps the information of the face information registration destination recorded in the system memory 52, and registers face information subsequently registered as face information for the same person as that registered in step S1223. When it is determined that the additional registration has not been instructed (determination operation has been executed in choice "NO") (NO in step S1228), the processing returns to step S1229.

Figure 13F:
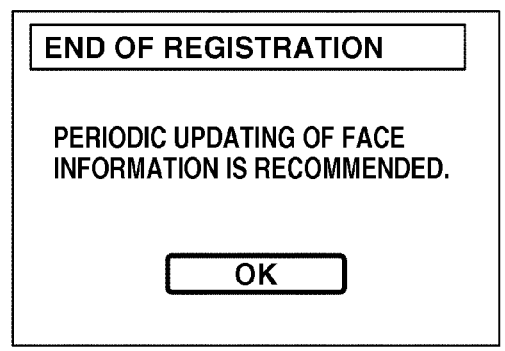

In step S1229, the system control unit 50 displays a registration end time guide (registration end screen). FIG. 13F illustrates a display example of the registration end time guide. Accordingly, by displaying prompting the user to periodically update the face information, updating of the face information is promoted, and the accuracy of individual authentication is improved.

Even when the SW 1 is turned ON during the display of the screen, the processing proceeds not to the face registration processing of step S1201 but to the image-capturing standby state of the image-capturing mode (step S501 illustrated in FIG. 5). A reason for the return to the image-capturing standby state by the turning-ON of the SW 1 at this timing is similar to that of step S1224, i.e., registration of at least one piece of face information has been completed in step S1223.

In step S1230, the system control unit 50 determines whether a determination operation has been executed by an "OK" button displayed in the registration end time. When it is determined that the determination operation has not been executed by the "OK" button (NO in step S1230), the processing waits for execution of the determination operation by the "OK" button. When it is determined that the determination operation has been executed by the "OK" button (YES in step S1230), the system control unit 50 discards the ID of the person of the registration destination temporarily stored in the system memory 52 to end the face registration processing. Then, the processing proceeds to the face registration mode processing of step S801 illustrated in FIG. 8 to display the registration menu on the display unit 28.

In the face registration processing according to the present exemplary embodiment, until the number of pieces of face information registered for the same person reaches the upper limit (less than predetermined number), additional registration of the face information in step S1226 for each registration of face information is prompted.

Thus, even a user not accustomed to the operation can smoothly register a plurality of pieces of face information for the same object during a series of registration operations. As a result, authentication accuracy can be improved as compared with a case where one piece or little face information has been registered for the same object.

In the face registration processing according to the present exemplary embodiment, control is executed to change to the registration standby state when the shutter button 61 is half-pressed after the acquisition of the image including the face to be registered in step S1211 and before the registration in step S1223. Thus, when acquisition of an image including a face to be registered is executed all over again, it can be quickly carried out.

On the other hand, control is executed to change to the image-capturing standby state when the shutter button 61 is half-pressed after the registration in step S1223. Thus, a next image can be quickly captured after the registration of the face information has ended.

The example of initially displaying the cursor 1101 (initial selection) for the oldest registered face image in the registered face information list in step S1106 illustrated in FIG. 10 has been described. However it is not limited to this, and, among the plurality of pieces of registered face information, face information having feature data similar to those of other face information may be initially selected.

For example, in the example illustrated in FIG. 11C, among the pieces of face information registered in the same person ID, a face image 1102 and a face image 1103 are captured with bright background and from front sides with smiling faces, and feature data of both of them are similar to each other. Even when two pieces of face information having feature data similar to each other are registered, contribution to accuracy of individual authentication is little. Thus, one of these pieces of face information (face information of face image 1102 and face information of face image 1103) similar to each other is initially selected to be displayed.

Thus, the accuracy of individual authentication can be improved by prompting replacement of the initially selected face information similar to the other face information and providing variation to the registered face information. It is more desirable to initially select older face information among a plurality of pieces of similar face information.

When in the profile input receiving state in step S1219 illustrated in FIG. 12, a power saving mode (display OFF) is set because of no user's operation carried out for a predetermined time, and then a recovery operation is executed, the processing may proceed to step S1201. This is for enabling, because the screen becomes dark once, the user to easily understand the state before the display-OFF at the time of recovery.

Further, the example of proceeding to step S1229 to end the registration when the number of pieces of registered face information has reached the upper limit in step S1225 illustrated in FIG. 12 (not less than predetermined number) has been described. However, the invention is not limited to this.

When additional registration is instructed after the guide including another message different from the additional guide displayed in step S1226 has been displayed, the processing may proceed to the additional registration setting of step S1001 illustrated in FIG. 10. That is, in this case, registration of new face information substituting one of the pieces of registered face information (replacement) is prompted. A message displayed on the guide may be, for example, "UPPER LIMIT HAS BEEN REACHED, CONTINUE REGISTRATION?" or "UPPER LIMIT HAS BEEN REACHED, REGISTER NEW FACE INFORMATION REPLACING OTHER REGISTERED FACE INFORMATION?".

This prevents interference with the continuance of registration in an image-capturing state that may enable acquisition of characteristic face information different from the face information registered thus far (e.g., it becomes dark when only face information captured in a bright outdoor state has been registered).

As yet another message different from the additional guide displayed in step S1226, a message prompting replacement of face information of an old registration date or a message prompting replacement of any one of them when there are data somewhat similar to the registered feature data may be displayed.

When additional registration is instructed after such a message has been displayed (replacement of face information is instructed), the processing proceeds to the additional registration setting of step S1001 illustrated in FIG. 10. This provides variation to the registered face information. Thus, improvement of the accuracy of the individual authentication can be expected.

Even if the number of pieces of registered face information is less than the upper limit, when the feature data included in the registered face information has enough variation for executing individual authentication, the display of the additional registration guide in step S1226 may not be carried out. Specifically, a step of determining whether the feature data of the registered face information include feature data similar to each other after "YES" has been determined in step S1225 is added. When there are similar feature data, the processing proceeds to step S1226. Otherwise, the processing proceeds to step S1229.

Thus, even if the number of pieces of registered face information has not reached the upper limit, when a feature data group easily authenticated individually has been registered, any additional registration is prevented, thereby saving time for registration.

The example of changing to the image-capturing standby time of step S501 illustrated in FIG. 5 when the SW 1 is turned ON in step S1227 illustrated in FIG. 12 has been described. However, it is not limited to this, and, even if the SW 1 is turned ON in step S1227, when the recording medium 200 is not loaded, not the image-capturing standby state (step S501 illustrated in FIG. 5) but the face registration processing may be continued.

In this case, the processing proceeds to the additional registration setting of step S1001 illustrated in FIG. 10 (when the number of pieces of registered face information has reached the upper limit) or step S1201 illustrated in FIG. 12 (when the number of pieces of registered face information has not reached the upper limit). This is because when the recording medium 200 is not loaded, an advantage of changing to the image-capturing standby state is limited for the user since actual image-capturing cannot be carried out to record a captured image in the recording medium 200, and it is more effective to continue the face registration processing.

Further, when a registered face is detected in step S502 illustrated in FIG. 5, whether face information of the detected registered face includes old one (registered predetermined time or more before current time) is subsequently determined. When there is, updating of the face information may be prompted.

More specifically, after step S502, referring to update date recorded in association with each face information registered in the person ID of the detected registered face, it is determined whether there is any face information registered predetermined time or more before the current time. When there is no face information registered predetermined time or more before the current time, the processing proceeds to step S503. When there is, additional registration of face information is prompted by the following method.

First, together with a message advising replacement of the face information because it includes old face information, options for executing replacement of the face information are displayed on the display unit 28. For example, a choice of "YES"/"NO" is displayed with a message "THERE IS OLD IMAGE. REPLACE FACE INFORMATION?". When "NO" is selected (determination operation), the processing proceeds to step S503. Thereafter, no displaying prompting replacement of the face information is not executed even when the registered face of this person ID is detected again before the end of the image-capturing mode processing.

When "YES" is selected (determination operation), in the system memory 52, registration destination person ID of face information to be acquired is temporarily stored as ID of the registered face detected in step S502, and face information to be replaced with face information to be acquired is temporarily stored as person ID of an oldest update date in the person ID. Then, the processing proceeds to the face registration processing of step S1201 illustrated in FIG. 12, and the face registration processing illustrated in FIG. 12 is carried out.

In this case, after the end of the face registration processing, the processing proceeds not to step S801 but to step S501 illustrated in FIG. 5 to set an image-capturing standby state, thereby continuing the image-capturing mode processing. This enables, even without executing any operation of intentionally changing to the registration menu, the user to update the face information when the feature data of the face becomes old to reduce its reliability. Thus, the reliability of the feature data registered in the face dictionary can be maintained.

The exemplary embodiment has been described by taking the example of registering the person face and the profile to carry out individual authentication. However, it is not limited to the person face or the profile, and other information can be used as long as it can identify whether the object detected from the image is a registered object.

For example, the present exemplary embodiment can be applied to a case where an animal image, its feature data (feature amount), and its profile are registered, and whether the animal image detected from an image is a registered animal such as a pet can be identified.

Further, the present exemplary embodiment can be applied to a case where an image of a landmark (mark of its place or building to be a symbol), its feature data, its name, and associated information are registered, and whether the image of the building detected from an image is the registered landmark is identified.

It has been described that the control of the system control unit 50 is carried out by one hardware unit. However, the entire apparatus can be controlled by sharing among a plurality of hardware units.

The exemplary embodiments of the present invention have been described in detail above. However, the invention is not limited to the exemplary embodiments. Various changes can be made without departing from the gist of the invention. Further, each embodiment is only an example, and the exemplary embodiments can be appropriately combined.

The exemplary embodiment has been described by way of example where the present invention is applied to the digital camera. However, it is not limited to this example, and the invention can be applied to any imaging apparatus as long as it can register face information for individual authentication. Specifically, the invention can be applied to a personal computer or a personal digital assistance (PDA) with a camera, a portable telephone terminal with a camera, a music player with a camera, a game machine with a camera, an electronic book reader with a camera, and a tablet terminal with a camera.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-287920 filed Dec. 28, 2011, No. 2011-287921 filed Dec. 28, 2011, and No. 2011-287922 filed Dec. 28, 2011, which are hereby incorporated by reference herein in their entirety.

What is claimed is:

1. An imaging apparatus having an imaging unit, comprising:
　　a registration unit configured to register a plurality of feature data up to an upper limit number in a nonvolatile memory in association with a same object;
　　an authentication unit configured to identify whether an object detected from an image captured by the imaging unit is a registered object based on the feature data registered in the nonvolatile memory;
　　a selection unit configured to select one of objects registered in the nonvolatile memory for which new feature data is registered by the registration unit; and
　　a control unit configured to perform control to display a selection screen for allowing, when the object selected by the selection unit is the object for which the upper limit number of feature data has been registered, a user to select the feature data to be replaced with the new feature data among the upper limit number of feature data registered for the object;
　　wherein the registration unit registers the new feature data by replacing the feature data selected on the selection screen.

2. The imaging apparatus according to claim 1, wherein the control unit performs control, when the object selected by the selection unit is the object for which the upper limit number of feature data has been registered, to display a checking screen for checking whether to replace the feature data registered for the object before the selection screen is displayed, and display the selection screen when the replacement of the checking screen is selected.

3. The imaging apparatus according to claim 1, wherein the registration unit registers feature data extracted from the image of the object to be registered, which has been captured by the imaging unit, as the new feature data.

4. The imaging apparatus according to claim 1, wherein the control unit performs control to display, as the selection screen, a list of images registered in association with the plurality of feature data registered for the selected object.

5. The imaging apparatus according to claim 1, wherein the control unit performs control to display the selection screen in an initial selection state of feature data having oldest registration date.

6. The imaging apparatus according to claim 1, wherein the control unit performs control to display the selection screen in an initial selection state of, among the plurality of feature data registered for the selected object, any one of feature data similar to one another.

7. The imaging apparatus according to claim 1, wherein the control unit initially selects, among the feature data similar to one another, feature data having oldest registration date.

8. The imaging apparatus according to claim 1, further comprising a determination unit configured to determine, when the object detected from the image captured by the imaging unit is identified to be a registered object by the authentication unit, whether the feature data registered in association with the registered object includes old feature data registered before a current date by predetermined time or more,
wherein when the determination unit determines that the old feature data is included in the registered object, the control unit performs control to display a registration screen for registering feature data extracted from the image of the object captured by the imaging unit by replacing the old feature data.

9. The imaging apparatus according to claim 8, wherein when the determination unit determines that the old feature data is included in the registered object, the control unit performs control to display a checking screen for checking whether to replace the old feature data before the registration screen is displayed, and display the registration screen when the replacement of the checking screen is selected.

10. The imaging apparatus according to claim 1, wherein the feature data is about a person face.

11. An imaging apparatus comprising:
an imaging unit;
an authentication unit configured to identify whether an object detected from an image captured by the imaging unit is a registered object;
a setting unit configured to set the imaging apparatus to a registration standby state for capturing an image of the object to be registered as an object to be used for identification by the authentication unit;
a registration unit configured to capture the image of the object to be registered in response to an instruction received in the registration standby state, and register feature data extracted from the captured image as feature data of a specific object in a nonvolatile memory;
a display control unit configured to perform control to display an additional registration screen for allowing, when the number of feature data registered for the specific object is less than a predetermined number after the registration by the registration unit, a user to select whether to additionally register feature data for the specific object; and
a control unit configured to perform control to change to the registration standby state when an instruction of executing additional registration is received from the user during displaying the additional registration guide,
wherein the display control unit performs control to display, when the number of feature data registered for the specific object is less than the predetermined number after the registration by the registration unit, a guide including a message to prompt replacement of feature data having an old registration date for the specific object or a message to prompt, when the registered feature data include similar data to some extent, replacement of one of the feature data, and display a list of registered face information for the specific object for selecting feature data to be replaced when an instruction of replacing face information is received from the user during displaying the guide.

12. An imaging apparatus comprising:
an imaging unit;
an authentication unit configured to identify whether an object detected from an image captured by the imaging unit is a registered object;
a setting unit configured to set the imaging apparatus to a registration standby state for capturing an image of the object to be registered as an object to be used for identification by the authentication unit;
a registration unit configured to capture the image of the object to be registered in response to an instruction received in the registration standby state, and register feature data extracted from the captured image as feature data of a specific object in a nonvolatile memory;
a display control unit configured to perform control to display an additional registration screen for allowing, when the number of feature data registered for the specific object is less than a predetermined number after the registration by the registration unit, a user to select whether to additionally register feature data for the specific object; and
a control unit configured to perform control to change to the registration standby state when an instruction of executing additional registration is received from the user during displaying the additional registration guide, wherein even when the number of feature data registered for the specific object is less than the predetermined number after the registration by the registration unit, the display control unit performs control not to display the additional registration guide when there is variation enough for executing individual authentication of the feature data registered for the specific object.

13. An imaging apparatus comprising:
an imaging unit;
an authentication unit configured to identify whether an object detected from an image captured by the imaging unit is a registered object;
a setting unit configured to set the imaging apparatus to a registration standby state for capturing an image of the object to be registered as an object to be used for identification by the authentication unit;
a registration unit configured to capture the image of the object to be registered in response to an instruction received in the registration standby state, and register feature data extracted from the captured image as feature data of a specific object in a nonvolatile memory;
a display control unit configured to perform control to display an additional registration screen for allowing, when the number of feature data registered for the specific object is less than a predetermined number after the registration by the registration unit, a user to select whether to additionally register feature data for the specific object; and
a control unit configured to perform control to change to the registration standby state when an instruction of executing additional registration is received from the user during displaying the additional registration guide, wherein the control unit performs control to change to an image-capturing standby state for capturing an image to be recorded in a recording medium when a shutter operation unit is operated during displaying the additional registration guide.

14. An imaging apparatus comprising:
an imaging unit;
a shutter operation unit configured to receive an instruction of capturing an image by the imaging unit to record the image in a recording medium;
an authentication unit configured to identify whether an object detected from the image captured by the imaging unit is a registered object;
a setting unit configured to set the imaging apparatus to a registration standby state for capturing an image of the object to be registered as an object to be used for identification by the authentication unit;
an acquisition unit configured to temporarily acquire the image of the object in response to an instruction received in the registration standby state in the recording medium;
a registration unit configured to register feature data extracted from the image of the object acquired by the acquisition unit in a nonvolatile memory; and
a control unit configured to perform control to change to the registration standby state when the shutter operation unit is operated after the acquisition by the acquisition unit and before the registration by the registration unit, and change to an image-capturing standby state for capturing the image to be recorded in the recording medium when the shutter operation unit is operated after the registration of the feature data by the registration unit.

15. The imaging apparatus according to claim 14, further comprising a display control unit configured to control a display unit to display a through-image captured in the registration standby state by the imaging unit and a display item indicating the registration standby state.

16. A method for controlling an imaging apparatus having an imaging unit, comprising:
registering a plurality of feature data up to an upper limit number in a nonvolatile memory in association with a same object;
identifying whether an object detected from an image captured by the imaging unit is a registered object based on the feature data registered in the nonvolatile memory;
selecting one of objects registered in the nonvolatile memory for which new feature data is registered; and
performing control to display a selection screen for allowing, when the selected object is the object for which the upper limit number of feature data has been registered, a user to select the feature data to be replaced with the new feature data among the upper limit number of feature data registered for the object;
wherein the new feature data is registered by replacing the feature data selected on the selection screen.

17. A method for controlling an imaging apparatus having an imaging unit, comprising:
identifying whether an object detected from an image captured by the imaging unit is a registered object;
setting an image of the object to be registered as an object to be used for identification in a registration standby state for image-capturing by the imaging unit;
capturing an image of the object to be registered in response to an instruction received in the registration standby state, and registering in a nonvolatile memory feature data extracted from the captured image as feature data of a specific object;
performing control to display an additional registration screen for allowing, when the number of feature data registered for the specific object is less than a predetermined number after the registration, a user to select whether to additionally register feature data for the specific object; and
performing control to change to the registration standby state when an instruction of executing additional registration is received from the user during displaying the additional registration guide,
wherein the display control unit performs control to display, when the number of feature data registered for the specific object is less than the predetermined number after the registration by the registration unit, a guide including a message to prompt replacement of feature data having an old registration date for the specific object or a message to prompt, when the registered feature data include similar data to some extent, replacement of one of the feature data, and display a list of registered face information for the specific object for selecting feature data to be replaced when an instruction of replacing face information is received from the user during displaying the guide.

18. A method for controlling an imaging apparatus having an imaging unit and a shutter operation unit configured to receive an instruction of capturing an image by the imaging unit to record the image in a recording medium, the method comprising:
identifying whether an object detected from an image captured by the imaging unit is a registered object;
setting an image of the object to be used for identification in a registration standby state for image-capturing by the imaging unit;
temporarily acquiring in the recording medium the image of the object in response to an instruction received in the registration standby state;
registering in a nonvolatile memory feature data extracted from the acquired image of the object; and
performing control to change to the registration standby state when the shutter operation unit is operated after the acquisition and before the registration, and change to an image-capturing standby state for capturing the image to be recorded in the recording medium when the shutter operation unit is operated after the registration of the feature data.

* * * * *